TAPE RECORDER

Filed Sept. 8, 1967 23 Sheets-Sheet 1

YUKITADA AYUKAWA &
ISAO KOZU:
INVENTORS

BY Wenderoth, Lind & Ponack
ATTORNEYS

TAPE RECORDER

Filed Sept. 8, 1967

YUKITADA AYUKAWA &
ISAO KOZU:
INVENTORS

BY Wenderoth, Lind & Ponack
ATTORNEYS

YUKITADA AYUKAWA
AND ISAO KOZU
INVENTORS

BY Wenderoth, Lind & Ponack
ATTORNEYS

TAPE RECORDER

Filed Sept. 8, 1967

YUKITADA AYUKAWA, AND
ISAO KOZU

INVENTORS

BY Wenderoth, Lind & Ponack.
ATTORNEYS

INVENTORS
YUKITADA AYUKAWA, AND
ISAO KOZU

BY Wenderoth, Lind & Ponack
ATTORNEYS

YUKITADA AYUKAWA &
ISAO KOZU
INVENTOR.

BY Wenderoth, Lind & Ponack
ATTORNEYS

TAPE RECORDER

Filed Sept. 8, 1967 23 Sheets-Sheet 7

YUKITADA AYUKAWA &
ISAO KOZU:
INVENTORS

BY Wenderoth, Lind & Ponack
ATTORNEYS

TAPE RECORDER

Filed Sept. 8, 1967

23 Sheets-Sheet 8

YUKITADA AYUKAWA &
ISAO KOZU:
INVENTORS

BY Wenderoth, Lind & Ponack
ATTORNEYS

TAPE RECORDER

Filed Sept. 8, 1967 23 Sheets-Sheet 9

INVENTORS
YUKITADA AYUKAWA
and ISAO KOZU
BY Wenderoth, Lind & Ponack
ATTORNEYS

YUKITADA AYUKAWA &
ISAO KOZU:
INVENTORS

BY Wenderoth, Lind & Ponack
ATTORNEYS

Sept. 30, 1969 YUKITADA AYUKAWA ETAL 3,469,800

TAPE RECORDER

Filed Sept. 8, 1967 23 Sheets-Sheet 11

YUKITADA AYUKAWA and ISAO KOZU: INVENTORS

BY Wenderoth, Lind & Ponack ATTORNEYS

YUKITADA AYUKAWA and
ISAO KOZU:
INVENTORS

BY Wenderoth, Lind & Ponack
ATTORNEYS

TAPE RECORDER

Filed Sept. 8, 1967

23 Sheets-Sheet 13

YUKITADA AYUKAWA &
ISAO KOZU
INVENTORS

BY Wenderoth, Lind & Ponack
ATTORNEYS

YUKITADA AYUKAWA et al
ISAO KOZU
INVENTORS

BY Wenderoth, Lind & Ponack
ATTORNEYS

Sept. 30, 1969 YUKITADA AYUKAWA ETAL 3,469,800

TAPE RECORDER

Filed Sept. 8, 1967 23 Sheets-Sheet 15

YUKITADA AYUKAWA et al
ISAO KOZU:
INVENTORS

BY Wenderoth, Lind & Ponack
ATTORNEYS

TAPE RECORDER

Filed Sept. 8, 1967 23 Sheets-Sheet 16

YUKITADA AYUKAWA
and ISAO KOZU
INVENTORS

BY Wenderoth, Lind & Ponack
ATTORNEYS

TAPE RECORDER

Filed Sept. 8, 1967 23 Sheets-Sheet 17

YUKITADA AYUKAWA et al
ISAO KOZU
INVENTORS

BY Wenderoth, Lind & Ponack
ATTORNEYS

YUKITADA AYUKAWA and ISAO KOZU, INVENTORS

BY Wenderoth, Lind & Ponack
ATTORNEYS

YUKITADA AYUKAWA et al
ISAO KOZU

INVENTORS

BY Wenderoth, Lind & Ponack

ATTORNEYS

YUKITADA AYUKAWA &
ISAO KOZU:

INVENTORS

BY Wenderoth, Lind & Ponack

ATTORNEYS

INVENTORS:
YUKITADA AYUKAWA &
ISAO KOZU

BY Wenderoth, Lind & Ponack
ATTORNEYS

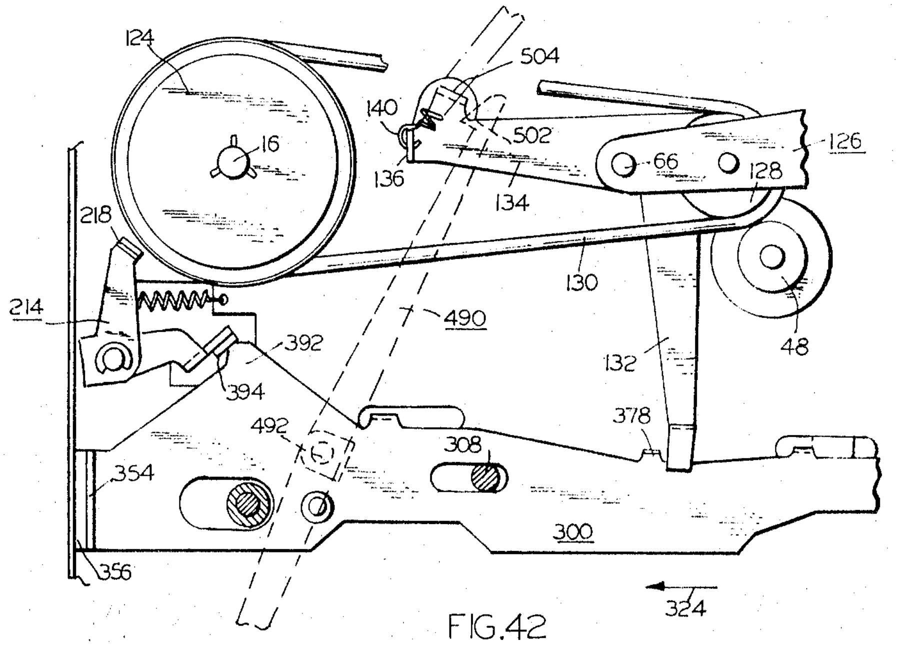
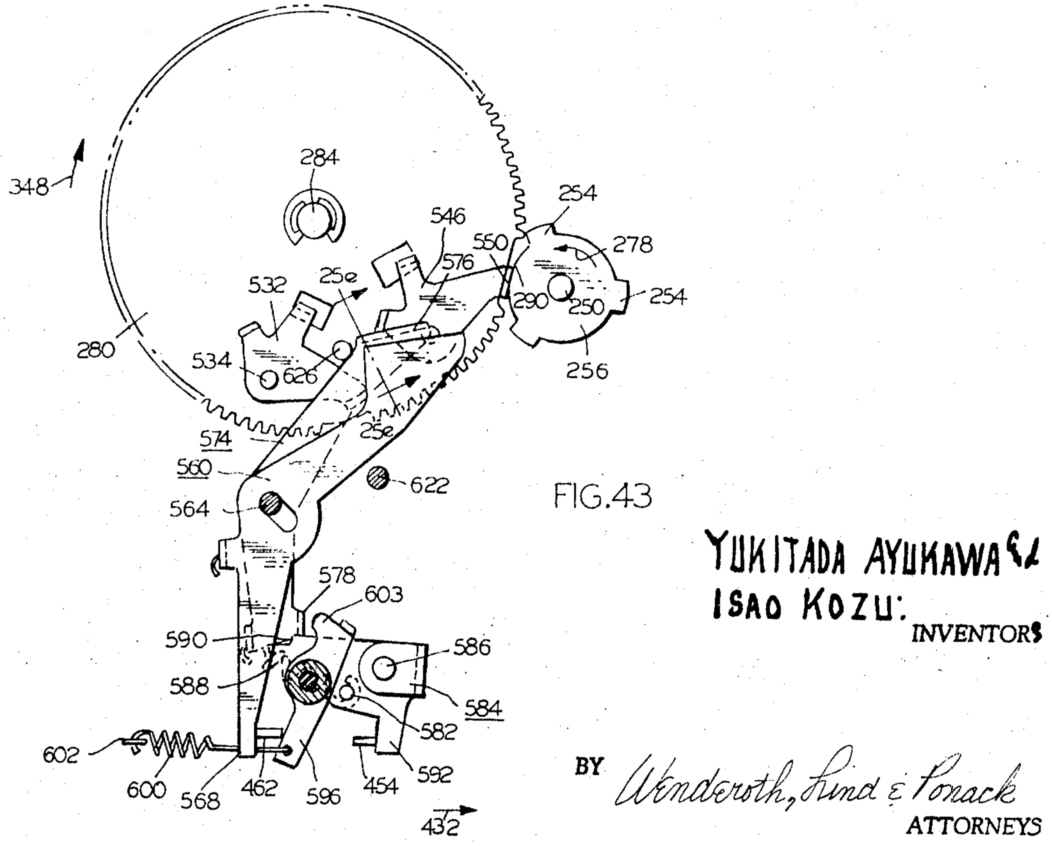
FIG. 42
FIG. 43
YUKITADA AYUKAWA &
ISAO KOZU,
INVENTORS
BY Wenderoth, Lind & Ponack
ATTORNEYS Sept. 30, 1969 YUKITADA AYUKAWA ETAL 3,469,800

TAPE RECORDER

Filed Sept. 8, 1967 23 Sheets-Sheet 23

YUKITADA AYUKAWA et al
ISAO KOZU
INVENTORS

BY Wenderoth, Lind & Ponack
ATTORNEYS

United States Patent Office 3,469,800
Patented Sept. 30, 1969

3,469,800

TAPE RECORDER

Yukitada Ayukawa, Neyagawa-shi, and Isao Kozu, Osaka-shi, Japan, assignors to Matsushita Electric Industrial Co. Ltd., Kadoma, Osaka, Japan Filed Sept. 8, 1967, Serial No. 666,248
Claims priority, application Japan, Sept. 8, 1966, 41/60,015; Sept. 12, 1966, 41/60,688
Int. Cl. G11b *15/44, 25/06;* G05g *11/00*
U.S. Cl. 242—190 15 Claims

ABSTRACT OF THE DISCLOSURE

A driving and braking control system for a tape recorder comprising tape moving means for moving a tape at a tape playing speed including reel roller rotating means for rotating a take-up reel roller at both a fast rate for fast forward drive of the tape and at a normal playing speed, and for rotating a supply reel roller for rewind drive of the tape; brake means for braking the take-up reel roller and the supply reel roller; driving means for selectively operating the reel rotating means and the brake means by a drive motor and clutch means provided to intermit the driving force between the driving means and the motor, and to operate the braking means in response to clutch actuating mechanism operated by a push button selection means for choosing among the "play," "record," "fast forward," "rewind," and "stop" states of operation.

BACKGROUND OF THE INVENTION

Field of the invention

This invention relates to a tape recorder and particularly to a tape recorder capable of changing to a condition of "play," "record," "fast-forward," "rewind" or "stop" by employing the rotational power of a motor. More particularly, this invention relates to a tape recorder in which tape moving means, reel roller rotating means and brake means are driven by driving means utilizing the rotational power of said motor in such a way that a selection means, controlled by an operator, actuates clutch means for intermitting said rotational power to said driving means.

DESCRIPTION OF THE PRIOR ART

In a conventional tape recorder, selection means are of the push button type or the rotatable knob type and to operate said means requires the application of a pressure which may cause pain to the operator's finger. Such a high pressure is not desirable for operating said selection means.

A pinch roller of a tape recorder usually requires a pressure of from 2 to 4 lbs. in order to press it against a capstan in order to move the tape in a stable manner. In order to allow the tape to be easily inserted between the capstan and the pinch roller it is desirable for the pinch roller to be spaced about half an inch from the capstan when the selection means is positioned at "stop." Therefore, it is necessary to move the pinch roller through said distance against the pressure of from 2 to 4 lbs. In addition, it is necessary to drive the various means which rotate the reel roller and which brake the reel roller. A great deal of power is required to operate the various means directly by a push button mechanism or a rotatable knob. For example, a push button for a tape recorder having a simple construction and adaptable for a wide range of uses must be pressed by a pressure of about 6 lbs. This cannot be achieved by a child or a lady having long nails. Also, a tape recorder for use in an educational program is subjected to repeated stopping and starting and consequently makes an operator tired.

At present such disadvantages can be overcome by a tape recorder provided with a push button selection means comprising an electrical switch. Said electrical selection means requires many solenoids and is expensive to manufacture.

SUMMARY OF THE INVENTION

Accordingly, the general object of the present invention is to overcome such disadvantages by employing the rotational power of a motor in the selection of a given operation of a tape recorder without using expensive components.

Another object of the invention is to provide a tape recorder characterized by improved means comprising driving means which include a driving element which moves in one direction to place the recorder in a condition of "play," "record," "fast-forward" or "rewind" and moves in the opposite direction to place the recorder in the condition of "stop."

A further object of the invention is to provide a tape recorder comprising an improved means for quickly transmitting rotational power from a motor to a mutilated gear when a clutch means is actuated by a selection means in order to quickly achieve the desired condition of the tape recorder after an operation of the selection means.

A further object of the invention is to provide a tape recorder comprising an improved driving means capable of instantaneously operating tape moving means, reel roller rotating means and braking means when the clutch means is actuated by the selection means so as to rotate a mutilated gear.

A further object of the invention is to provide a tape recorder comprising a driving means which is driven slowly in one direction by a cam disc secured to a mutilated gear so as to achieve the condition of "stop" and which can be instantaneously driven in the opposite direction, by the force of spring means which was previously preloaded by the rotational power of said mutilated gear, to achieve a condition of "play," "record," "fast-forward" or "rewind."

A further object of the invention is to provide a tape recorder comprising a push button device which includes a "play" key, a "fast-forward" key, a "rewind" key and a "stop" key, said push button device being capable of being operated by a slight pressure and being relatively simple and inexpensive in construction.

A further object of the invention is to provide a tape recorder comprising an improved means capable of changing directly to the desired condition by using a mutilated gear which rotates so as to automatically achieve the condition of "stop."

A further object of the invention is to provide a tape recorder comprising an improved means which ensures the transmission of the rotational power of said mutilated gear to a driving element and which makes it possible for the rotational power of said motor to intermit a clutch device mounted on said mutilated gear without imparting undesirable force.

A further object of the invention is to provide a tape recorder comprising an improved means which changes immediately after the operation of the selection means to the condition of "play," "record," "fast-forward" or "rewind" by making the angle through which said mutilated gear rotates during the change to an operation condition, less than that during a change to a "stop" condition. Said improved means also shortens the time period necessary for obtaining a given tape speed after said change.

A further object of the invention is to provide a tape recorder provided with additional clutch actuating means for actuating clutch means in order to go from an operation condition to an "instant stop" condition without operating the selection means.

A further object of the invention is to provide a tape recorder which can be changed to a condition of "instant stop" by actuating a solenoid for actuating the clutch means, by remote control.

A further object of the invention is to provide a tape recorder comprising an improved means in which detecting means to detect the presence of the tape in a predetermined path cooperatively actuates clutch means in order to automatically change to a condition of "stop" in such a way that a power source for a motor and for a recording and reproducing amplifier is automatically cut off when the tape is fully wound on a take-up reel or on a supply reel or when it is accidentally cut.

The above objects are achieved by the tape recorder of the present invention which comprises tape moving means for moving a tape at a tape playing speed; reel roller rotating means, including means to rotate a take-up reel roller at a fast rate for fast-forward drive of the tape and/or at the tape playing speed, and means to rotate a supply reel roller for rewind drive of the tape. Said tape recorder further comprises brake means for braking said take-up reel roller and said supply reel roller; driving means for selectively operating said tape moving means, said reel roller rotating means and said brake means by the force of a motor; selection means including choosing means to select from among the conditions of "play," "record," "fast-forward," "rewind" and "stop," and a control means which is responsive to said choosing means and which controls the operation of said tape moving means and said reel roller rotating means. Clutch means are provided to intermit the driving power between said driving means and said motor by clutch actuating devices which are operated by said selection means.

BRIEF DESCRIPTION OF THE DRAWINGS

The invention will now be described in detail in the following detailed description taken with the accompanying drawings, in which:

FIG. 42 is a plan view of the supply reel roller rotating means showing the parts in the "rewind" position;

FIG. 43 is a plan view similar to that of FIG. 39 showing the position of the clutch means after being actuated by the "play" key, "fast-forward" key or "rewind" key.

DISCLOSURE OF THE PREFERRED EMBODIMENTS

Figure 1:
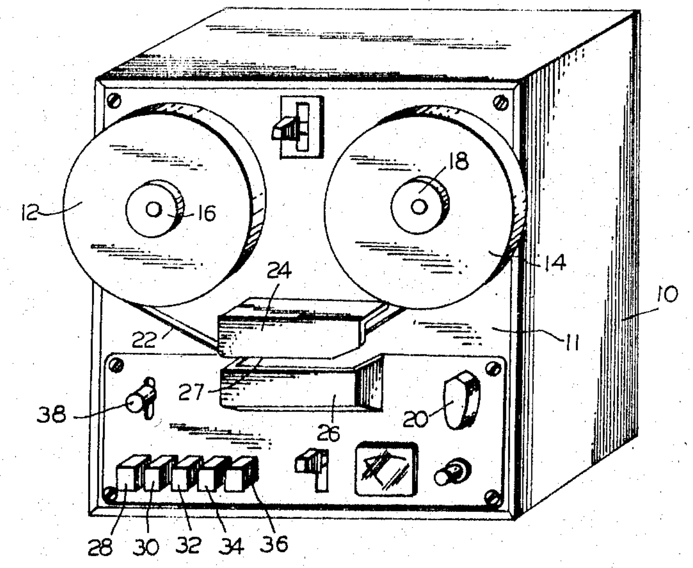
FIG. 1 is a perspective view of a tape recorder according to the present invention.

Referring to FIG. 1, reel shafts 16 and 18 are attached to a front panel 11 of a cabinet 10 of a tape recorder according to the present invention so as to rotate freely in suitable bearing means forming a part thereof. A supply reel 12 and a take-up reel 14 are positioned on said reel shafts 16 and 18, respectively. A knob 20, attached to said cabinet 10 controls a power switch for turning a power source on and off. A magnetic tape 22 wound on said supply reel 12 is fed from said supply reel 12 through a tape guiding path 27 between a head cover 24 and a cover 26 to said take-up reel 14 so as to be wound on said take-up reel 14.

A front panel 11 of said cabinet 10 is provided with a push button device which acts as a selection means and which comprises a "rewind" key 28, a "stop" key 30, a "fast-forward" key 32, a "play" key 34 and a "record" key 36. A knob 38 for instant stop is also positioned on said front panel 11.

Figure 2:
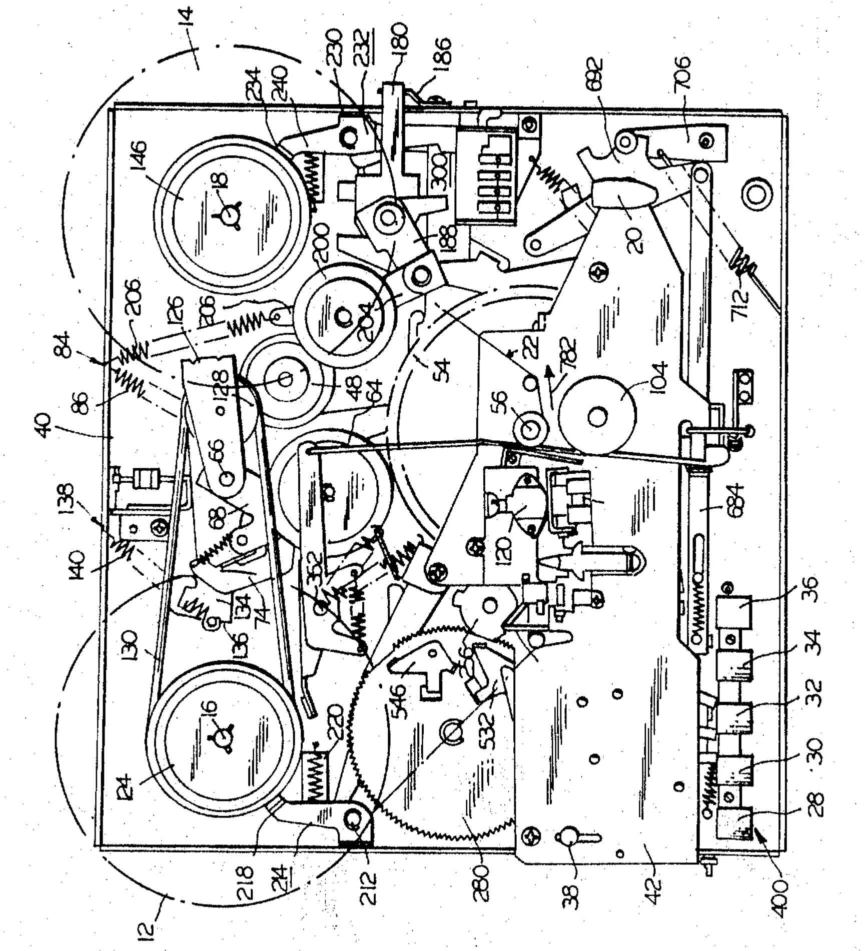
FIG. 2 is a top plan view of said tape recorder with the cabinet thereof removed.
Figure 3:
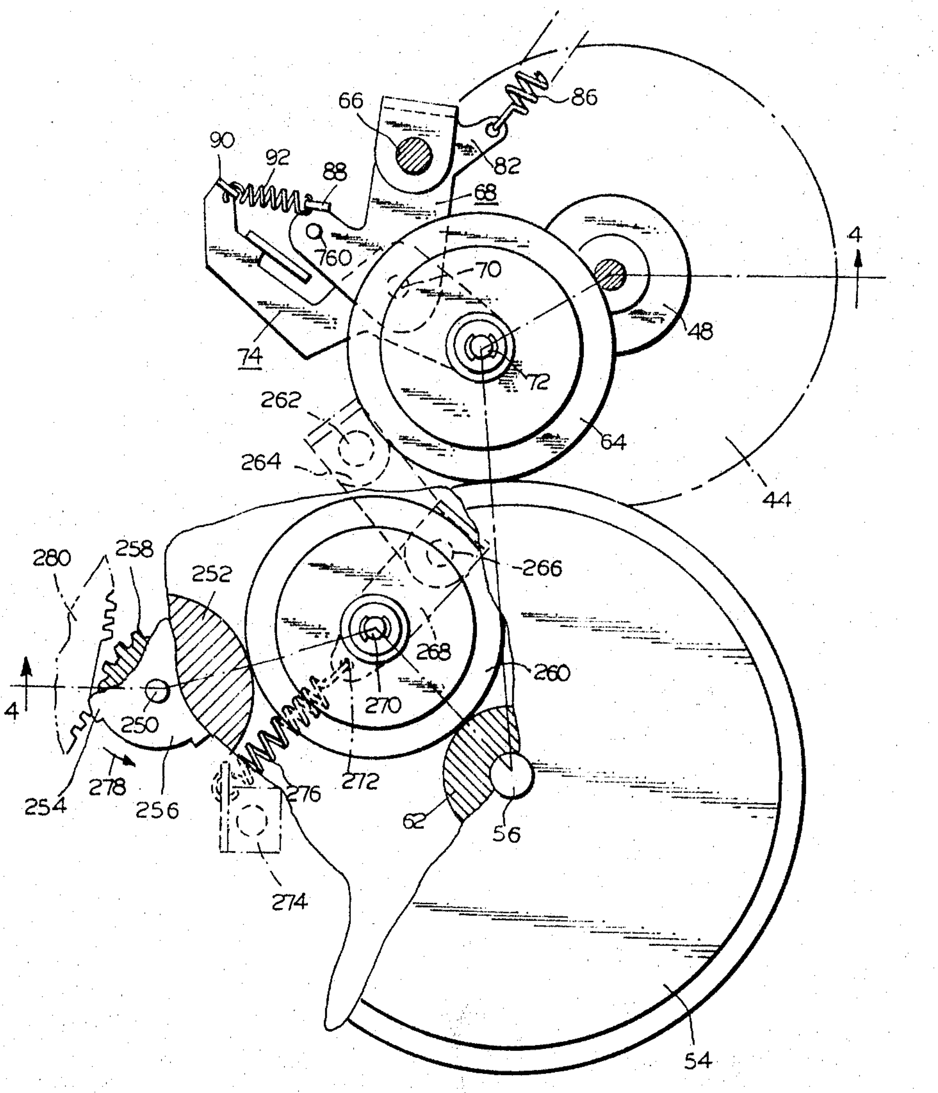
FIG. 3 is a plan view partly in section and partly broken away of means to transmit the power of the motor to the driving means of said tape recorder.
Figure 4:
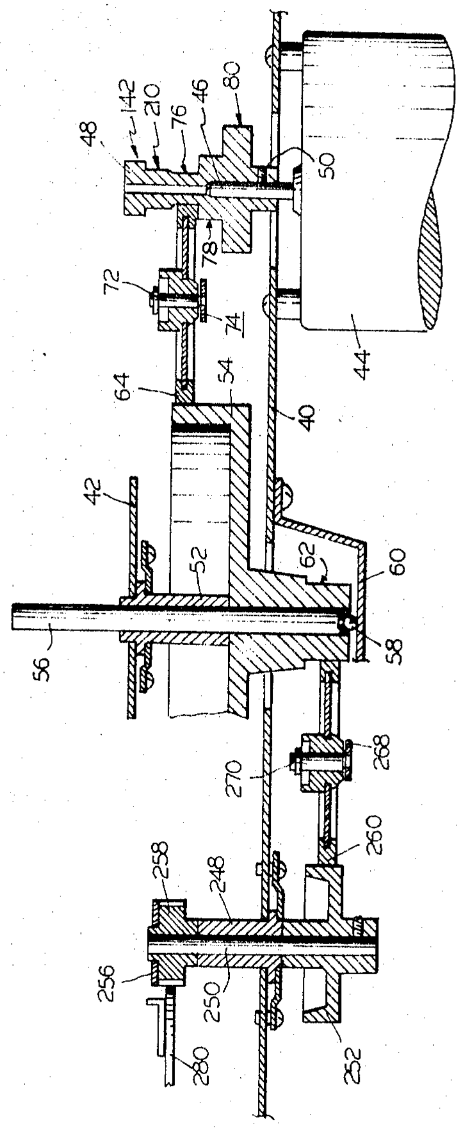
FIG. 4 is a sectional view taken on line 4—4 in FIG. 3.

In the interior of said cabinet 10 there are mounted a main chassis 40 and an upper chassis 42 which are parallel to each other and spaced from each other as shown in FIG. 2 and FIG. 4. Referring to FIGS. 3 and 4, the power necessary for each operation of the tape recorder is supplied by a motor 44 which is fixed to said main chassis 40. A driving shaft 46 of said motor 44 extends thru said main chassis 40 and has a driving pulley 48 thereon which has five stepped portions and which is secured to said shaft 46 by a set screw 50.

Referring again to FIGS. 2, 3, and 4, a detailed description of the tape moving means for moving the tape at a predetermined speed will be given.

A capstan 56 having a flywheel 54 secured thereto is rotatably mounted in a bearing 52 fixed to said upper chassis 42. The thrust load of said capstan 56 is supported by a steel ball 58 in a hole in a plate 60 at the bottom of said capstan 56. The supporting plate 60 is fixed to the lower surface of said main chassis 40. Said flywheel 54 has integral with the bottom thereof a first wheel section 62 for driving the driving means which will be illustrated hereinafter.

An interchangeable first idler wheel 64 is provided between said driving pulley 48 and said flywheel 54.

The detailed construction of the means for interchanging said first idler wheel 64 is as follows. A first lever 68 is slidably mounted for sliding movement in an axial direction of a shaft 66 and pivotally mounted on a shaft 66 vertically positioned on said main chassis 40. Said first idler wheel 64 is rotatably mounted on a shaft 72. Said shaft is secured to a second lever 74 which is swingably mounted on a shaft 70 which in turn is secured to one end of said first lever 68.

Said first lever 68 can be moved in an axial direction with respect to said shaft 66 by an arrangement where said first idler wheel 64 is removed from the space between the driving pulley 48 and the flywheel 54. This is accompanied by making said first lever 68 swing clockwise about said shaft 66. Such movement of said first lever 68 makes it possible to position said idler wheel 64 in one of three positions corresponding to the stepped portions 76, 78 and 80 of the driving pulley 48. The selective engagement of said first idler wheel 64 with one of said three stepped portions 76, 78 or 80 causes said flywheel 54 and said capstan 56 to rotate at a speed corresponding to that of the respective stepped portion 76, 78 or 80.

A spring 86, connected between a lug 82 on said first lever 68 and a hole 84 in said main chassis 40, causes said first lever 68 to swing counter-clockwise about said shaft 66 and pushes said first idler wheel 64 into contact with said driving pulley 48 and said flywheel 54 so as to transmit the rotational power of said driving pulley 48 to said flywheel 54. A spring 92 is connected between a lug 88, turned upward at the free end of said first lever 68, and a lug 90, turned upward at the end of said second lever 74 opposite the end having idler wheel 64 thereon. When the first lever 68 is pivoted clockwise about the shaft 66, the second lever 74 is pivoted clockwise about the shaft 70 under the bias of said spring 92 so that said first idler wheel 64 is positively separated from the driving pulley 48.

Figure 5:
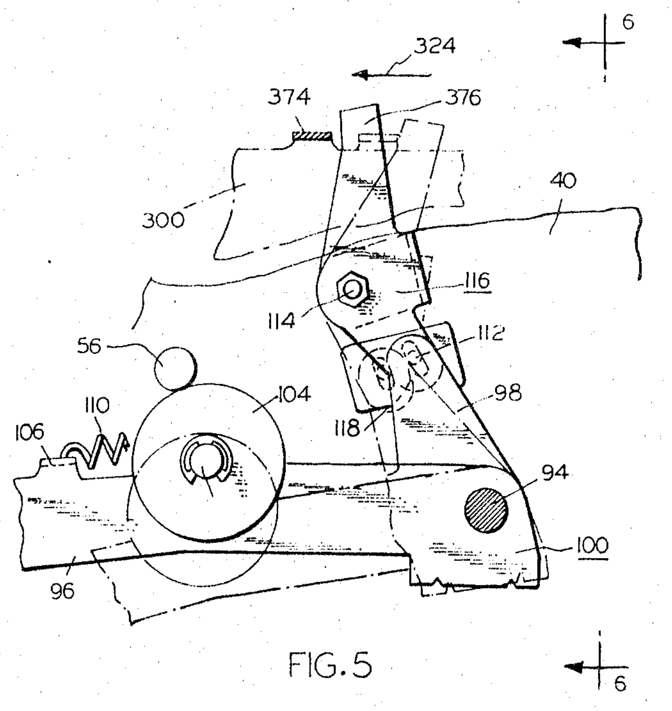
FIG. 5 is a fragmentary plan view of the tape moving means of said tape recorder.
Figure 6:
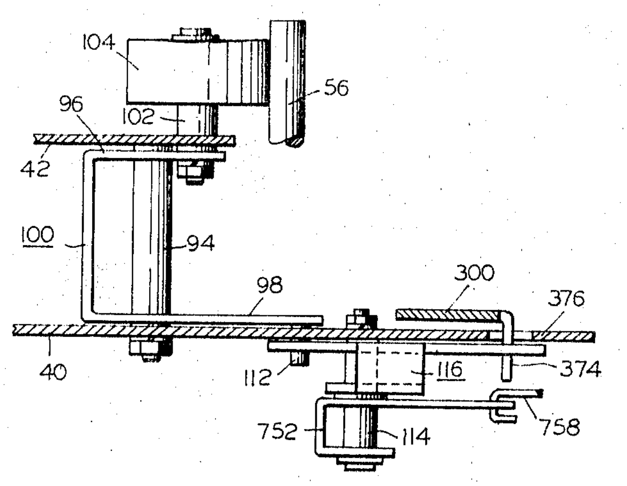
FIG. 6 is a side sectional view of the tape moving means taken along the line 6—6 of FIG. 5.
Figure 7:
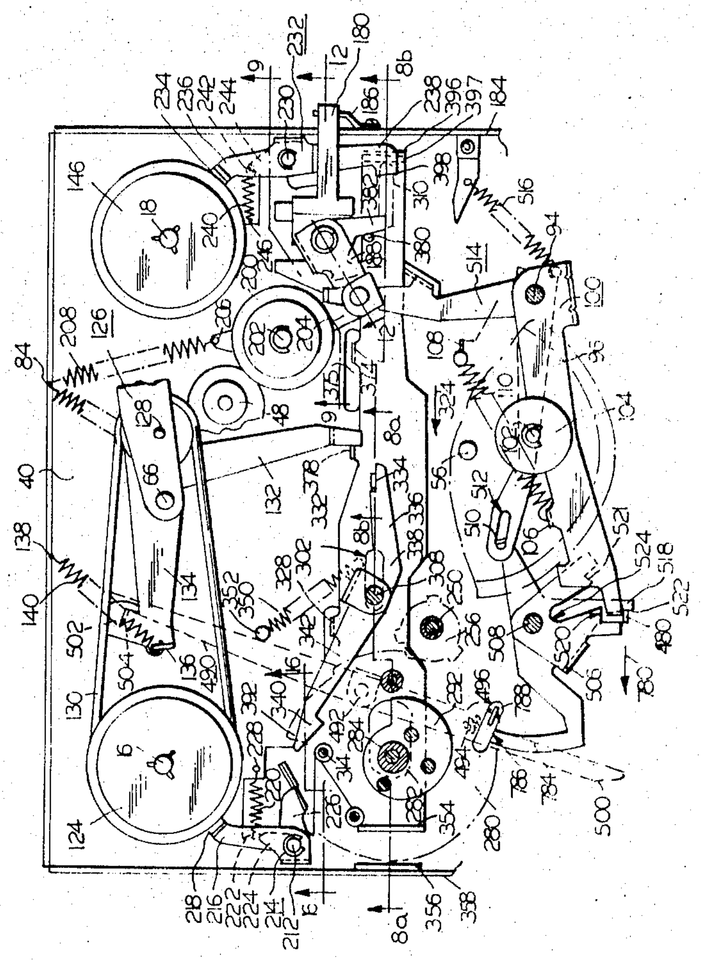
FIG. 7 is a fragmentary plan view similar to FIG. 2, certain parts being omitted for clarity.

Referring to FIGS. 5, 6 and 7, the aforesaid upper chassis 42 is secured to the aforesaid main chassis 40 by a shaft 94. A lever 100, having a first arm 96 extending beneath said upper chassis 42 and a second arm 98 extending over said main chassis 40, is pivotally mounted on said shaft 94. Said first arm 96 contains, at the center portion thereof, a shaft 102 extending thru said upper chassis 42. A pinch roller 104 is rotatably mounted on said shaft 102. Said lever 100 can be pivoted clockwise about said shaft 94 by means of a spring 110 connected between a lug 106 on said first arm 96 and a lug 108 on said upper chassis 42. The pivotal power of said lever 100 presses said pinch roller 104 against the upper portion of said capstan 56. Accordingly, the magnetic tape 22, pressed between the capstan 56 which is rotated counter clockwise by said motor 44 and said pinch roller 104, can move at a predetermined speed. Said lever 100 is pivoted by the pivoting of a lever 116 because a pin 112, secured to said second arm 98 of said lever 100, is positioned in a slot 118 which is formed in one end of said lever 116, which in turn is pivotally mounted on a shaft 114 secured to said main chassis 40.

Referring again to FIG. 2, the tape recorder, according to the present invention, is provided with a conventional magnetic head 120 for recording and reproducing a sound on the magnetic tape 22, a pad 122 for pressing said tape 22 against said head 120 and means for guiding said tape 22. Such devices are attached to the tape recorder in a conventional and suitable way and therefore it is not necessary to make a detailed description with respect to these devices.

Referring to FIGS. 2, 7 to 10, and 16, a detailed description will be given of the means for rotating the reel rollers which support the aforesaid supply reel 12 and the aforesaid take-up reel 14.

Referring to FIGS. 2, 7, 8*b* and 16, the supply reel 12 is supported by a supply reel roller 124 which is secured to aforesaid reel shaft 16 which is rotatably mounted in a bearing 125, secured to said main chassis 40. A pulley 128 is rotatably mounted on a lever 126, pivotally mounted on aforesaid shaft 66. An endless belt 130 is connected between said pulley 128 and an annular groove 127 formed in said supply roller 124. Said lever 126 is provided with a first arm 132 and a second arm 134 and is pivoted clockwise about said shaft 66 by a spring 140 connected between a lug 136 on said second arm 134 and a hole 138 in said main chassis 40. Thus the pivotal power of said lever 126 can press said endless belt 130, wound around said pulley 128, against the stepped portion 142 (FIG. 8*b*) of said driving pulley 48 so as to rotate said supply reel roller 124 clockwise.

Next there will be explained means for winding said magnetic tape 22 upon said take-up reel 14.

Figure 9:
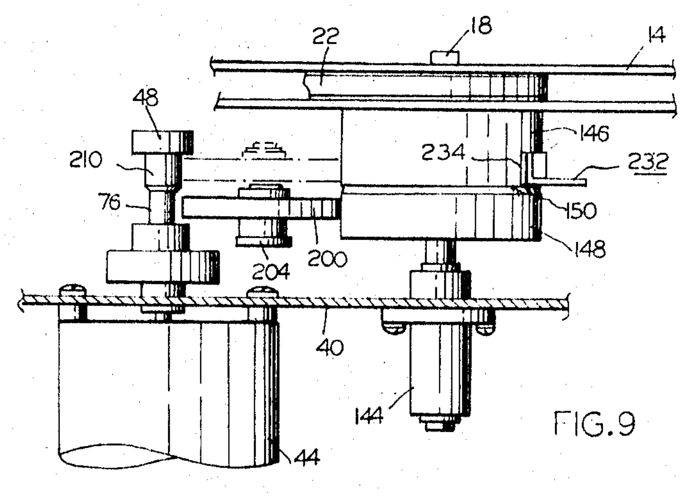
FIG. 9 is an elevational view on an enlarged scale of the take-up reel rollers, partially in section, taken along the irregular line 9—9 of FIG. 7.

Referring to FIG. 9, an upper take-up reel roller 146, capable of supporting aforesaid take-up reel 14, is fixed to aforesaid reel shaft 18 which is rotatably mounted in a bearing 144, which is secured to said main chassis 40. A lower take-up reel roller 148 is positioned beneath said upper take-up reel roller 146 and is rotatably mounted on said reel shaft 18. A friction coupling comprising a felt ring 150 is positioned between the upper face of said lower take-up reel roller 148 and the lower face of said upper take-up reel roller 146.

Referring to FIGS. 2, 7, 8*b*, 10 and 11, a spacer ring 156 is mounted on a shaft 154 which is secured to a part 152 extending downward from said main chassis 40. A member 160 having a cam portion 158 extending up from both sides thereof is positioned on said shaft 154 with the shaft extending through a slot 162 and is prevented from moving upward by a half-moon retainer 164.

A spring 170 is connected between a hole 166 of said member 160 and a hole 168 positioned in a side part 184 of said main chassis 40. Said member 160 is biased by said spring 170 in the direction shown by an arrow 172 while being urged to rotate counter-clockwise about said shaft 154. The rotation of said member 160 is restricted by an extension 174 formed on said chassis 40. The upper surface of a half-moon retainer 176 affixed to said shaft 154 comes into contact with a subsidiary plate 180, having a hole 178 therein for the shaft 154, so that it is loosely mounted on said shaft 154. A lug 182 at one end of said plate 180 is supported by a plate 186 which is secured to the side part 184 of said main chassis 40. A boss 190, secured to a lever 188, is positioned above said plate 180 and rotatably mounted on said shaft 154. Said boss 190 is pressed downward by the action of a compression spring 196, retained at one end by a ring 192 and a half-moon retainer 194 on the end of shaft 154. Another lever 204, having a shaft 202 secured thereto is pivotally mounted on a shaft 198 secured to one end of the upper portion of said first lever 188. An idler wheel 200 is rotatably mounted on said shaft 202.

Referring again to FIG. 7, a spring 208 is connected between a hole 206 formed at one end of said second lever 204 and aforesaid hole 84 of said main chassis 40 and makes said first lever 188 rotate clockwise about said shaft 154. The rotation of said first lever 188 causes said idler wheel 200 to selectively engage between a stepped section 210 of said driving pulley 48 and said upper take-up reel roller 146 or between the stepped portion 76 of said driving pulley 48 and said lower take-up reel roller 148 as shown more clearly in FIG. 9. Consequently, the rotational power of said driving pulley 48 can be selectively transmitted to said take-up reel rollers 146 and 148.

Brake means for braking said supply reel roller 124 and said take-up reel roller 146 will be explained with reference to FIGS. 2, 7, 8*a* and 16.

A brake lever 214 is pivotally mounted on a shaft 212 secured to said main chassis 40 in the vicinity of said supply reel roller 124. A first arm 216 on the upper portion of said brake lever 214 has a brake pad 218 which is secured thereto and engages with said supply reel roller 124. Said brake lever 214 has, at the bottom thereof, a second arm 224 having a hole 222 for connecting one end of a spring 220 and a third arm 226 which engages with a driving means illustrated hereinafter. Said spring 220 is connected, at the other end, to a hole 228 in said main chassis 40 and biases said brake lever 214 to rotate clockwise about said shaft 212. The rotation of said brake lever 214 presses said brake pad 218 against said supply reel roller 124 in order to brake said roller 124.

A brake lever 232 is rotatably mounted on a shaft 230 which is secured to the main chassis 40 in the vicinity of the take-up reel rollers 146 and 148, as shown in FIG. 7.

Said brake lever 232 has, at the upper portion thereof, a first arm 236 having a brake pad 234 at one end thereof and a third arm 238 which engages with a driving means illustrated hereinafter, and has, at the bottom, a second arm 244 having a hole 242 in which one end of spring 240 is connected. Said spring 240 is connected at the other end to a hole 246 in said main chassis 40 and biases said brake lever 232 such that it rotates counter clockwise about the shaft 230. The pivotal force of said brake lever 232 presses said brake pad 234 against said upper take-up reel roller 146 in order to brake it.

Driving means for operating said tape moving means, said reel roller rotating means and said brake means will be explained with reference to FIGS. 2 to 4, 7, 8*a* and 8*b*.

Now referring to FIGS. 3 and 4, a shaft 250 is rotatably mounted in a bearing 248 secured to said main chassis 40. Said shaft 250 has, at the lower portion thereof, a second wheel 252 secured thereto and, at the upper portion thereof, a pinion 258 secured thereto. Said pinion 258 is provided with a claw plate 256 which has three claws 254 and is secured to said pinion 258. A second idler wheel 260 is inserted between said first wheel section 62 of the flywheel 54 and said second wheel 252 in order to transmit the rotational power of said flywheel 54 to said second wheel 252. A lever 264 is pivotally mounted on a shaft 262 secured to said main chassis 40. Another lever 268 is pivotally mounted on a shaft 266, secured to one end of said first lever 264. Said second idler wheel 260 is rotatably mounted on a shaft 270 which is secured to said lever 268. A spring 276 is connected between a hole 272, located at one end of said second lever 268, and a member 274 on said main chassis 40. Said spring makes said first lever 264 pivot clockwise about said shaft 262. This rotational power of said first lever 264 pushes said second idler wheel 260 between the first wheel section 62 of the flywheel 54 and said second wheel 252. Accordingly, said pinion 258 is supplied with rotational power from aforesaid motor 44 and usually rotates in the direction indicated by the arrow 278.

Figure 13:
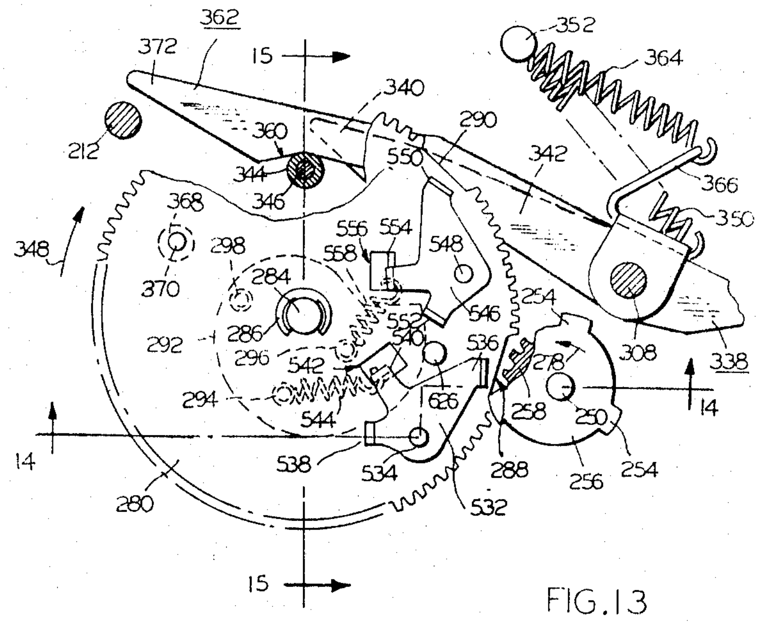
FIG. 13 is a plan view of the mutilated gear, partially broken away for clarity.
Figure 14:
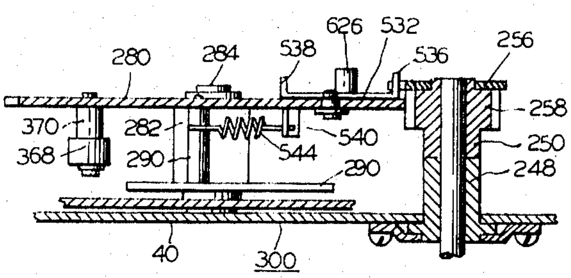
FIG. 14 is a sectional view taken along the line 14—14 of FIG. 13.
Figure 15:
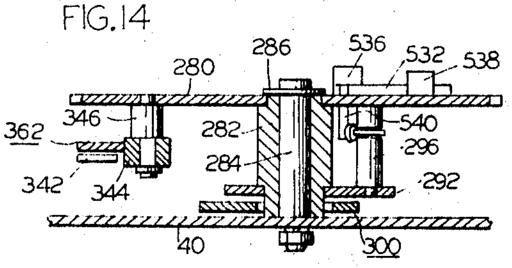
FIG. 15 is a sectional view taken along the line 15—15 of FIG. 13.

Referring to FIGS. 13 to 15, a mutilated gear 280 is rotatably mounted on a shaft 284, secured to said main chassis 40, through a boss 282 which is secured to said gear 280 at the upper portion thereof. Said mutilated gear 280 is engaged with said pinion 258 when required. A half-moon retainer 286 is secured to said shaft 284 in order to prevent said boss 282 from extending upward. Said mutilated gear 280 has, in the toothed portion thereof, a first section 288 and a second section 290 from which the teeth have been removed. Said sections are intended to interrupt the meshing engagement with said pinion 258. The tape recorder of the present invention is designed to achieve a condition of "stop" at a first stop position of said gear 280. In this position, said first toothless section 288 faces said pinion 258. At a second stop position of said gear 280, said second toothless section 290 faces said pinion 258 and the tape recorder achieves a condition of "play," "record," "fast-forward" or "rewind" as illustrated hereinafter. A cam disc 292 is attached to the bottom of said boss 282 and is fixed to said mutilated gear 280 by three stay poles 294, 296 and 298.

Figure 8A:
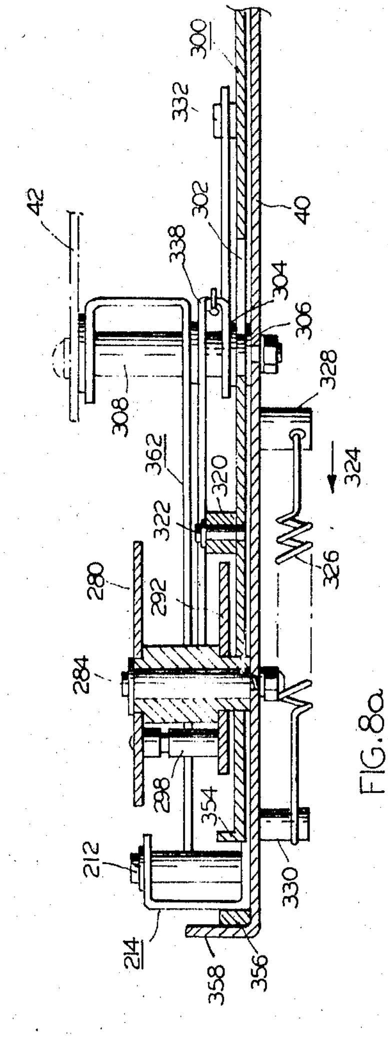
FIG. 8*a* is a longitudinal sectional view on an enlarged scale taken along the line **8*a*—8*a*** of FIG. 7.
Figure 8B:
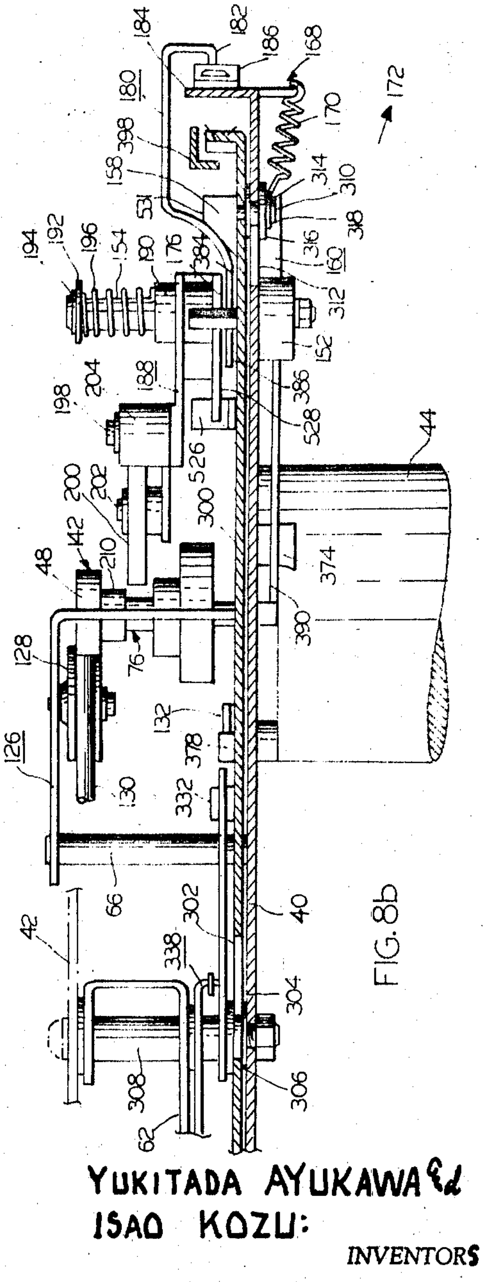
FIG. 8*b* is alongitudinal sectional view on an enlarged scale taken along the line **8*b*—8*b*** of FIG. 7.

Referring to FIGS. 7, 8*a* and 8*b*, a driving element 300 having an elongated shape is positioned along the upper surface of said main chassis 40 and is able to move forward and backward in accordance with the rotation of said gear 280. Said driving element 300 has a stay shaft 308 extending through a slot 302 thereof, which shaft together with spacer rings 304 and 306 firmly connects said main chassis 40 and said upper chassis 42. A pin 310 secured to one end of said driving element 300 extends through a slot 312 in said main chassis 40. Said driving element 300 is prevented from moving upward by a half-moon retainer 318 secured to said pin 310 in an arrangement in which spacer rings 314 and 316 are positioned above and below said slot 312, respectively. Therefore, said driving element 300 is guided so as to slide linearly along said slots 302 and 312. A shaft 322 is secured to the upper surface of said driving element 300 and a driving roller 320 engaged by said cam disc 292 is rotatably mounted on said shaft 322. A spring 326 is connected between a hook 328 extending downward from said driving element 300 and a pin 330 fixed to the bottom of said main chassis 40 and imparts a force to move said driving element 300 in the direction indicated by the arrow 324. At the first stop position of said gear 280, where said first toothless section 288 faces said pinion 258, said force imparted to said driving element 300 is opposed by an arrangement in which a lug 332 extending upward from said driving element 300 is latched by a stepped portion 334 of a first arm 336 of a locking device 338 mounted rotatably on said shaft 308 as shown in FIG. 7.

Referring to FIGS. 13 and 15, a lip 340 on a second arm 342 of said locking device 338 is moved, in accordance with the rotation of said gear 280 from its first stop position to its second stop position as indicated by an arrow 348, by a roller 344 rotatably mounted on a shaft 346 which is fixed to the lower surface of said gear 280. Accordingly, said device 338 is rotated clockwise about the shaft 308 in a direction which is against the force of a spring 350 which is connected between said locking device 388 and a pin 352, secured to said main chassis 40. When said device 338 of FIG. 7 rotates clockwise, the lug 332 of said driving element 300 is unlatched from the stepped portion 334 of said device 338. Consequently, said driving element 300 is moved instantaneously by the biasing force of said spring 326 in the direction shown by the arrow 324. A bent member 354 at one end of said driving element 300 pushes against a cushion member 356 of a rubber material, adhered to a side portion 358 of aforesaid main chassis 40 so as to damp the instant movement and to stop said driving element 300. When said selection means is in a "stop" condition said tape moving means, reel roller rotating means and brake means are driven by said driving element 300 and selectively achieve a state of "play," "record," "fast-forward" or "rewind" as illustrated hereinafter.

Referring to FIG. 13, at the first stop position of said gear 280 at which said first toothless section 288 of said gear 280 faces said pinion 258, a hollow portion 360 of an arm 362, pivotally mounted on said shaft 308, is pressed against the roller 344 of said gear 280 by the force of a spring 364 connected between the pin 352 and a lug 366 on said arm 362 so as to stop the rotation of said gear 280 and to hold the stop position. Another roller 368 rotatably mounted on a shaft 370, secured to said gear 280, is pressed by said arm 362 so as to hold said gear 280 in its second stop position, said position being when said second toothless section 290 faces said pinion 258. When said roller 344 or 368 separates from the hollow portion 360 of said arm 362 in accordance with the rotation of said gear 280, said arm 362 is rotated counterclockwise by the action of the spring 364. However, the rotation is limited by a projection 372 on said arm 362 engaging said shaft 212.

When the tape recorder of the present invention is in a state of "stop," the lug 332 of said driving element 300 is latched by the stepped portion 334 of the first arm 336 of said locking device 338, as shown in FIG. 7, and the tape moving means, the reel roller rotating means and the brake means are positioned in the "stop" positions. In FIGS. 5, 6, 7, and 8*b* a lug 374 on said driving element 300 extends downward toward said main chassis 40 and extends through a slot 375 in said main chassis 40. Said lug 374 moves an extended portion 376 of said lever 116 to a position indicated by the broken line in FIG. 5 and pivots said lever 116 clockwise about the shaft 114. Accordingly, the lever 100 is pivoted counter-clockwise about the shaft 94 and the pinch roller 104 separates from the capstan 56, as shown in FIG. 7, as the pin 112, secured to said lever 100, is driven by the action of the pin 112 against the slot 118 of said lever 116.

Figures 10, 34:
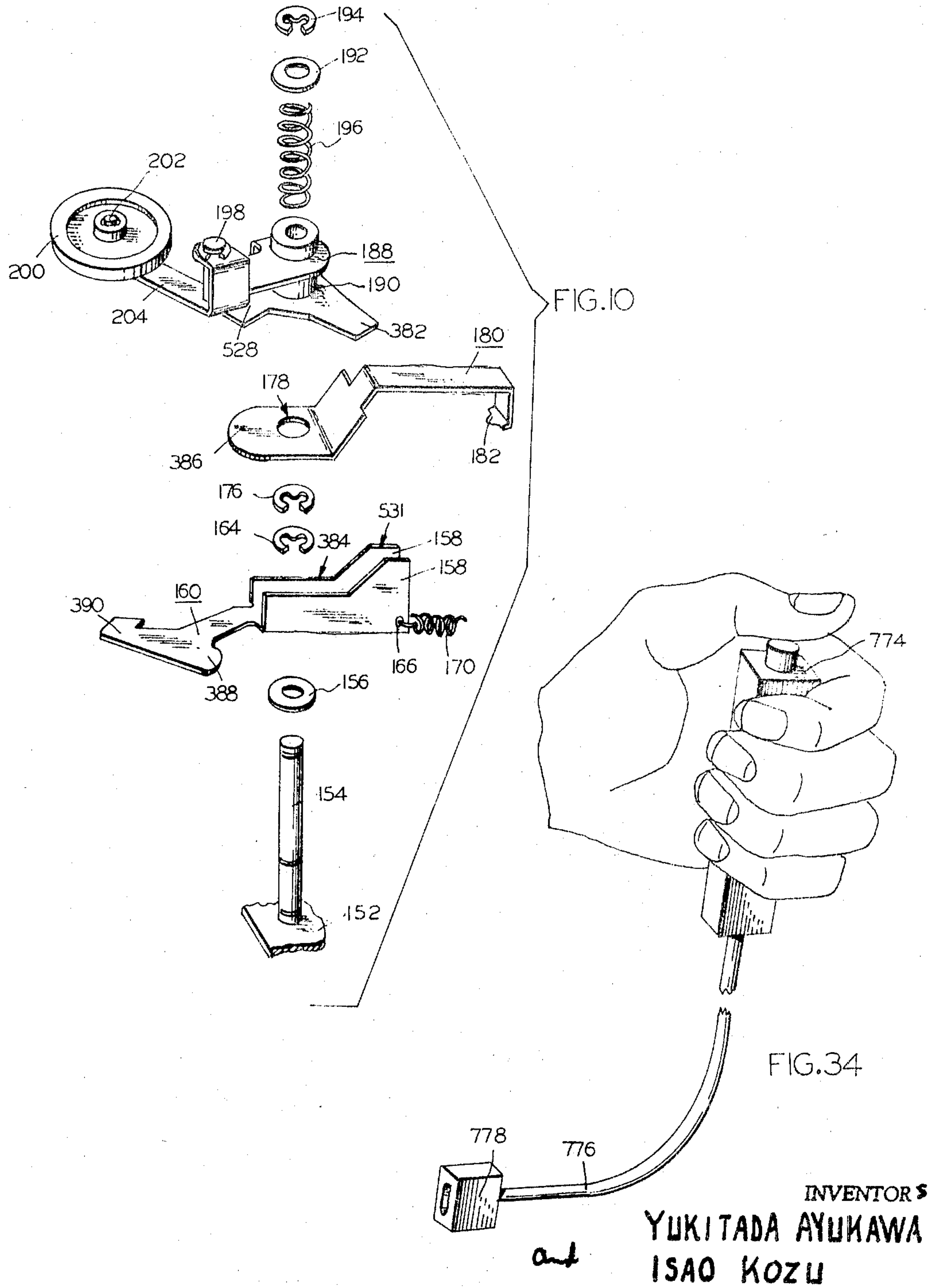
FIG. 10 is an exploded perspective view of the take-up reel roller rotating means.
FIG. 34 is a perspective view of a remote control switch for controlling the condition of "instant stop"

Referring again to FIGS. 7 and 8*b*, a lug 378 extending upwardly from said driving element 300 pushes the end of the first arm 132 of the lever 126 and makes said lever 126 pivot counterclockwise about the shaft 66 in a direction opposed to the force of the spring 140. Therefore, the endless belt 130, extending around the pulley 128, is separated from the driving pulley 48 and thus, does not transmit the rotational power of the motor 44 to the supply reel roller 124. As seen in FIGS. 7, 8*b* and 10, a pin 380 secured to the upper face of said driving element 300, pushes against an arm 382 of the lever 188 and makes said first lever 188 pivot counterclockwise against the force of the spring 208. Accordingly, the idler wheel 200 is separated from the driving pulley 48 and the takeup reel rollers 146 and 148. Thus, the rotational power of the motor 44 is not transmitted to the take-up reel rollers 146 and 148.

Figure 11:
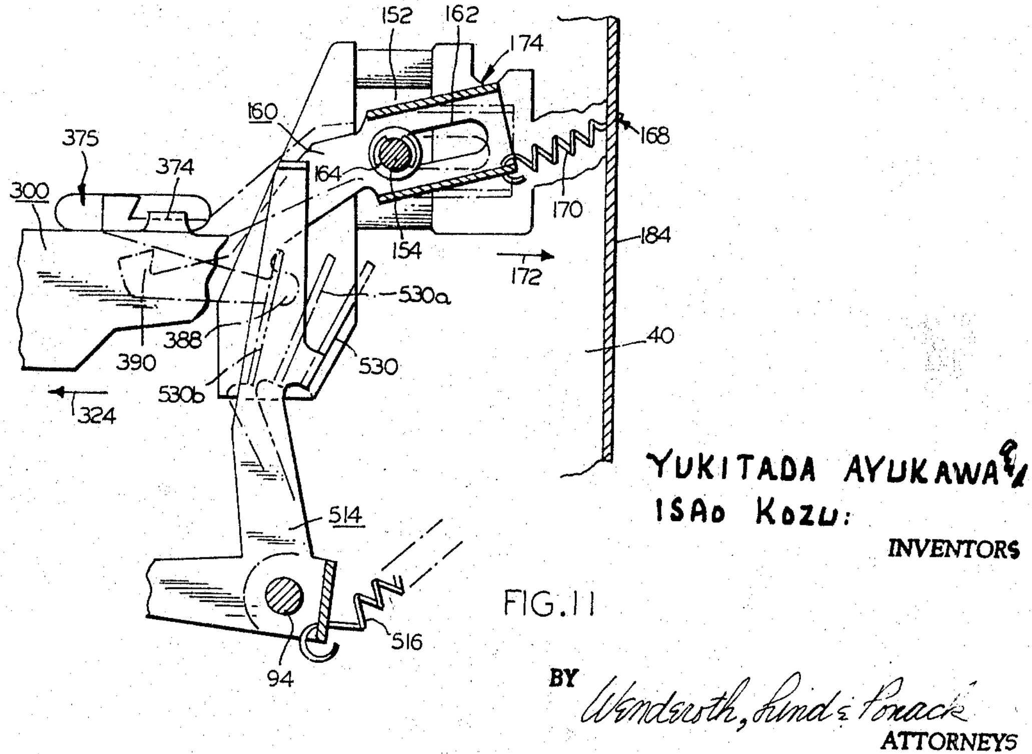
FIG. 11 is a sectional view of the take-up reel roller rotating means taken along the line 11—11 of FIG. 8*b*.

Refering to FIGS. 8*b* and 11, when said tape recorder is in the stop condition, the member 160 is drawn in the direction indicated by the arrow 172 and the lower step 384 of the cam portions 158 is positioned beneath a flat portion 386 of the subsidiary plate 180. Consequently, the lever 188 is pushed downward by the compressed spring 196 causing the idler wheel 200 to be positioned in the same horizontal plane as the stepped section 76 of the driving pulley 48 and the lower take-up reel roller 148. However, the idler wheel 200 is not positioned to engage with driving pulley 48 and the lower take-up reel roller 148. Said member 160 may be pivoted clockwise about the shaft 154 such that a hook 390 can engage with the lug 374 of said driving element 300 when a tab 388 of said member 160 is driven by a change of the selection means to the "fast-forward" condition.

Figure 16:
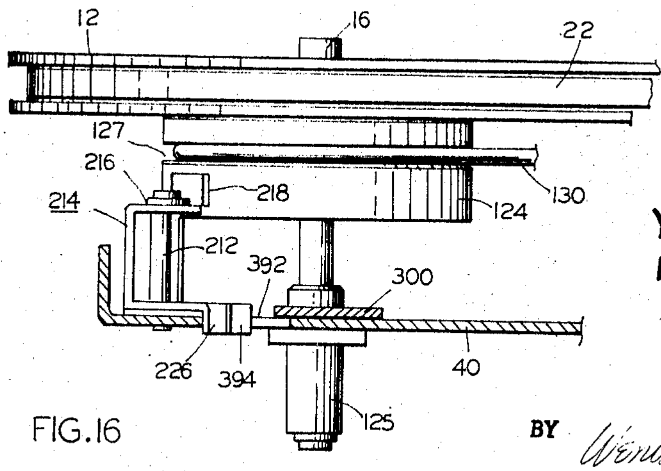
FIG. 16 is an elevational sectional view on an enlarged scale of a supply reel roller taken along the line 16—16 of FIG. 7.

Referring to FIGS. 7 and 16, said driving element 300 is provided with a projection 392 capable of driving a cushion plate 394, consisting of a rubber or a leather material which is secured to the third arm of the brake lever 214. Driving element 300 is also provided with a member 396 having a cushion plate 397 secured thereto, said cushion plate 397 being capable of driving a bent portion 398 of the third arm 238 of the brake lever 232. In the "stop" condition said projection 392 and said member 396 on the driving element 300 are spaced apart from said cushion plate 394 of the brake lever 214 and said bent portion 398 of the brake lever 232. Accordingly, said brake lever 214 is biased clockwise by the spring 220 and the brake pad 218 is pressed against the supply reel roller 124 so as to brake said supply reel roller 124. Also the brake lever 232 is biased counterclockwise by the spring 240 and the brake pad 234 is pushed against the upper take-up reel roller 146 so as to brake it. In the "stop" condition, the tape 22 does not move nor is it loose.

With reference to FIGS. 2, 7, 11 and 17 to 23, a detailed description will be made of the selection means which are capable of selecting a condition of "play," "record," "fast-forward," "rewind" or "stop" in accordance with the desire of the operator.

Referring to FIG. 2, the main chassis 40 is provided with a push button device 400 including a rewind key 28, a stop key 30, a fast-forward key 322, a play key 34 and a record key 36 as mentioned above. Such construction will be further explained in detail with reference to FIGS. 17 to 20.

Slide plates 402*a*, 402*b*, 402*c*, 402*d*, and 402*e* have various keys secured to the upper portions thereof and are similarly shaped and can slide vertically, being guided by a guide plate 408 and a lower portion 410 of a frame 404 which is fixed to said main chassis 40. Said guide plate 408 is secured to an upper portion 406 of said frame 404. Compression springs 412*a*, 412*b*, 412*c*, 412*d*, and 412*e* are positioned around elongated portions 414 of said slide plates 402 between the stepped portions 416, thereof, and the lower portion 410 of said frame 404, respectively. Said compression springs urge said slide plates 402 upward. Said stepped portions 416 also push against a cushion plate 418 which is made of rubber and which is secured to the lower face of said guide plate 408. A sliding latch plate 420 is superposed on a sliding actuating plate 422, and these two plates are positioned parallel to a side wall of said frame 404. Said plates 420 and 422 are guided for horizontal movement by lugs 424 and 426 consisting of the turned ends of the frame 404, by a rectangular slot 428 formed in the upper portion 406 of said frame 404, and by a guide pin 430, which is secured to the lower portion 410 of said frame 404 so that plates 420 and 422 can slide in the direction indicated by arrow 432 in the reverse direction. A spring 434 connected between a tab 436 of said sliding latch plate 420 and a tab 438 of said sliding actuating plate 422, biases the sliding actuating plate 422 in the direction indicated by the arrow 432 and biases the sliding latch plate 420 in the opposite direction. The slide plates 402 are provided with projections 440*a*, 440*b*, 440*c*, 440*d* and 440*e*, respectively, extending transversely to said frame 404 and said plates 420 and 422 and through aligned openings in said frame and plates. In FIG. 20, said openings in the sliding latch plate 420 are provided with noses 444*a*, 444*c*, 444*d* and 444*e* having, respectively, steps 448*a*, 448*c*, 448*d* and 448*e* and sloping sides 446*a*, 446*c*, 446*d* and 446*e*. Said sloping sides and steps are capable of engaging with bent upper portions 442*a*, 442*c*, 442*d* and 442*e*, respectively, on said projections 440. When said keys 28, 32, 34 and 36 are depressed in the direction shown by arrow 450 (FIG. 18), said bent upper portions 442 push against said sloping sides 446 of said noses 444 so as to make said sliding latch plate 420 slide in a direction indicated by arrow 432. When said bent upper portions 442 slide along said sloping sides 446 to the steps 448 of said noses 444, the force of the spring 434 causes said sliding latch plate 420 to slide in a direction opposite to the direction of the arrow 432. This results in said portions 442 being latched under the steps 448 of said noses 444. A sloping side 452 is provided in the opening of the sliding latch plate 420 corresponding to the bent upper portion 442*b* of the projection 440*b*, which projection is also turned transversely to said slide plate 402*b*. When the stop key 30 is depressed in the direction indicated by the arrow 450 (FIG. 18), the bent upper portion 442*b* of said projection 440*b* pushes against sloping side 452 so as to move the sliding latch plate 420 in the direction indicated by arrow 432. Accordingly, said keys 28, 32, 34 and/or 36, latched by said sliding latch plate 420, are unlatched and pushed upward, in a direction opposite to the direction of the arrow 450, by the action of said springs 412, 412*c*, 412*d* and/or 412*e*, respectively, so as to return them to their original positions. On the other hand, the stop key 30 is not latched by the sliding latch plate 420 and the action of spring 412*b* returns it to its raised position when depressing force, applied by the operator, is removed.

Said sliding latch plate 420 is provided with an upwardly extending projection 454 for actuating clutch means, illustrated hereinafter, and with an upwardly extending projection 456 which can engage with the automatic stop means such that said automatic stop means moves said sliding latch plate 420 in the direction of the arrow 432 to a condition of 'stop," thus returning the latched keys 28, 32, 34 and/or 36 to the raised position.

Sloping sides 458*a*, 458*c* and 458*d* are provided in said openings corresponding to said projections 440*a*, 440*c*, and 440*d* of said sliding actuating plate 422. When the rewind key 28, fast-forward key 32 and/or the play key 34 are depressed in the direction shown by arrow 450, the bent lower portions 460*a*, 460*c* and 460*d* of projections 440*a*, 440*c* and 440*d* of said keys 28, 32 and 34 push against said sloping sides 458 so as to cause said sliding actuating plate 420 to slide in the direction opposite to the direction of arrow 432. An upwardly extending projection 462 is provided on said sliding actuating plate 422 in order to transmit the sliding force to clutch means illustrated hereinafter. A back face of the frame 404 is provided with a means which engages with said keys 28, 32 and 34 and which drives means which engage said driving means and said tape moving means and said driving means and said reel roller rotating means when said keys 28, 32 and 34 are depressed.

Figure 17:
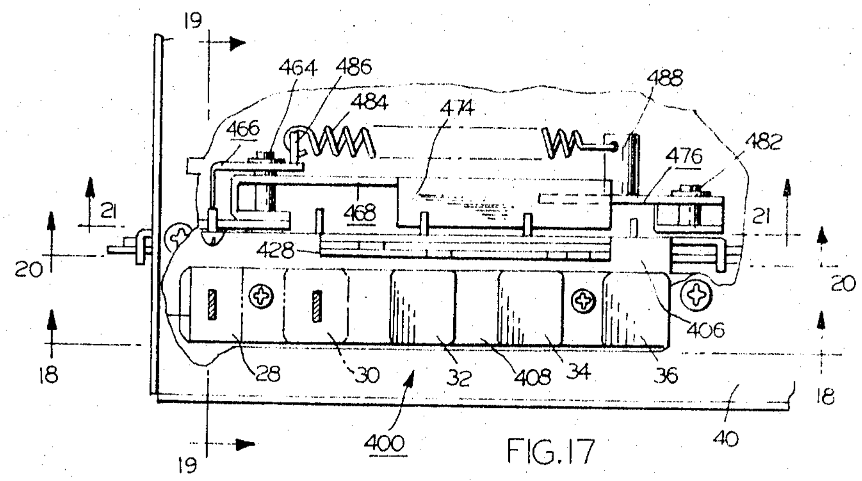
FIG. 17 is a plan view of selection means with certain parts broken away for clarity.
Figures 21, 22:
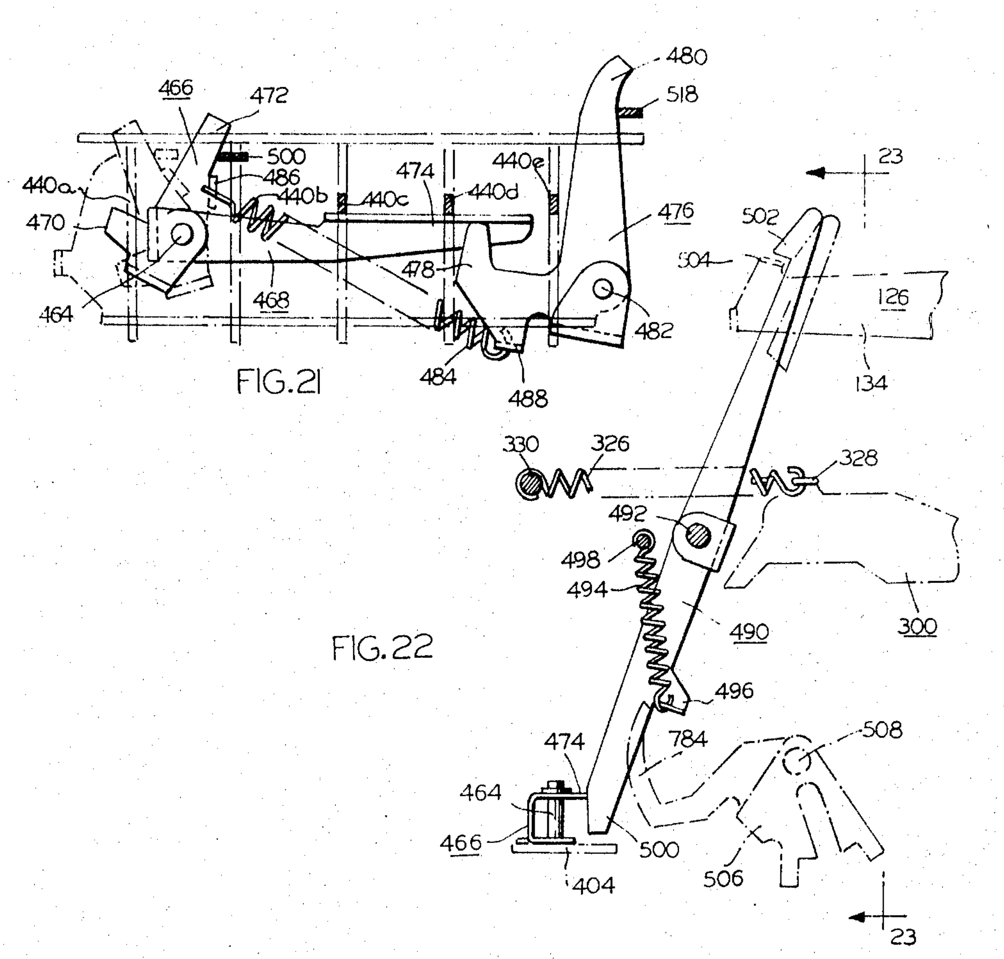
FIG. 21 is a longitudinal sectional view taken along the line 21—21 of FIG. 17.
FIG. 22 is a plan view of a part of the control means with the main chassis removed for the purpose of the clarity.
Figure 23:
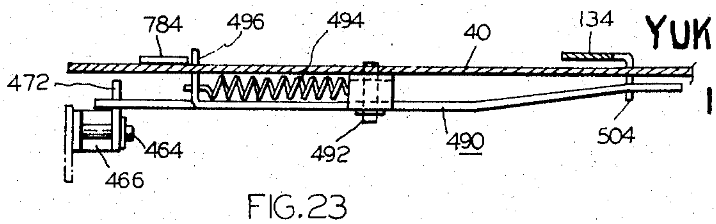
FIG. 23 is a sectional view taken along the line 23—23 of FIG. 22.

In FIGS. 17, 19 and 21, a lever 466 and a lever 468 are pivotally mounted on a horizontal shaft 464, fixed to the back face of said frame 404. The lever 466 is provided with an arm 470 which can engage with the projection 440*a* of the slide plate 402*a* to respond to the rewind key 28 and with another arm 472 which drives means for controlling the operation of the supply reel roller rotating means, illustrated below. The lever 468 has a bent portion 474 which can engage with projections 440*c* and 440*d* of the slide plates 402*c* and 402*d* in order to respond to the "fast-forward" key 32 and the "play" key 34. Since the distance from the shaft 464 to said projection 440*c* is shorter than that from said shaft 464 to said projection 440*d*, the angle through which the lever 468 pivots is smaller when the "play" key 34 is depressed than when the "fast-forward" key 32 is depressed.

On a horizontal shaft 482, fixed to the back face of said frame 404, is mounted rotatably, a further lever 476 which is provided with an arm 478, engaged by the bent portion 474 of the second lever 468, and with another arm 480 to drive means for controlling the operation of the tape moving means and take-up reel roller rotating means. Said lever 466 and said lever 476 are biased clockwise by a spring 484 which is connected between a tab 486 on said first lever 466 and a tab 488 on said third lever 476, as illustrated in FIG. 21.

Referring to FIGS. 7, and 21 to 23, a first control lever 490 is rotatably mounted on a shaft 492 which is secured to the lower face of said main chassis 40, and is biased clockwise by a spring 494, which is connected between a tab 496 and said lever 490 and a pin 498 secured to said main chassis 40. The pivotal power of said first control lever 490 is transmitted by pressing one end 500 thereof against the arm 472 of said lever 466. The force exerted clockwise on said lever 466 by the spring 484 (FIG. 21) is larger than the force exerted by the first control lever 490 (FIG. 22), so that the first control lever 490 occupies a position indicated by the solid line of FIG. 22 when the rewind key 28 is not depressed. In this case, a stepped portion 502 of the other end of said first control lever 490 is moved to a position capable of engaging with a lug 504 of the second arm 134 of said lever 126. Said first control lever 490 controls the operation of the supply reel roller rotating means in response to the movement of the rewind key 28. Such action will be explained below.

Referring to FIG. 21, the projection 440*a* of the slide plate 402*a* pushes against the arm 470 of the lever 466 when the "rewind" key 28 is depressed, causing said lever 466 to pivot counter-clockwise about the shaft 464 to the position indicated by the broken line. Therefore, as shown in FIG. 22, the action of spring 494 causes the first control lever 490 to rotate clockwise about the shaft 492 which in turn causes the stepped portion 502 of said first control lever 490 to move to a position, shown by the broken line, in which it does not engage with the lug 504 of the second arm 134 of the lever 126. When the driving element 300 moves in the direction shown by the arrow 324, as indicated in FIG. 42, the force of spring 140 causes lever 126 to rotate clockwise about the shaft 66 so as to push the endless belt 130, wound around the annular surface of the pulley 128, against the driving pulley 48. Accordingly, the supply reel roller 124 rotates clockwise resulting in the tape 22 being rewound on the supply reel 12. When said driving element 300 is moved in the direction shown by the arrow 324 without depressing the rewind key 28, the stepped portion 502 of the first control lever 490 of FIG. 7 is positioned such that it is capable of engaging with the lug 504 of the second arm 154 of the lever 126. Therefore, when said lever 126 starts to pivot clockwise, said lug 504 it latched by said stepped portion 502 thus preventing said endless belt 130 from coming into contact with the driving pulley 48. As a result, the supply reel roller 124 does not rotate.

The following description will explain the means for controlling the operation of the tape moving means and the take-up reel roller rotating means in response to the action of the "fast-forward" key 32 and the "play" key 34.

Referring to FIG. 7, a second control lever 506, rotatable in response to the rotation of the lever 476, is mounted on a shaft 508 extending between the main chassis 40 and the upper chassis 42. A bent tab 510, consisting of a turned end of the lower part of the second control lever 508, extends into a slot 512 of one arm of a third control lever 514 which is pivotally mounted on the shaft 94 so as to pivot coaxially with, but independent from, the lever 100. Therefore, said second control lever 506 and said third control lever 514 are pivoted in association with each other.

Figure 36:
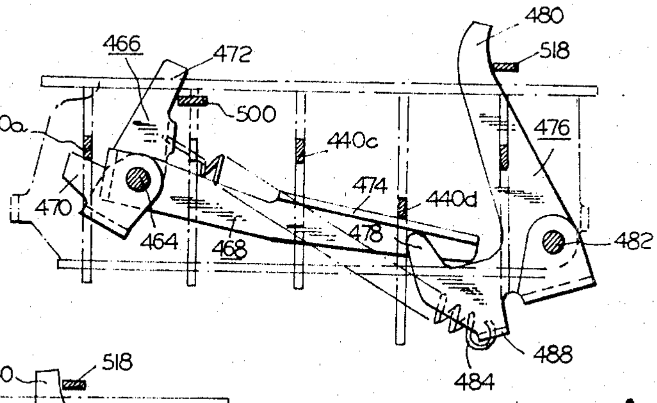
FIG. 36 is a view similar to that of FIG. 21 showing the "play" key when it is depressed.
Figure 37:
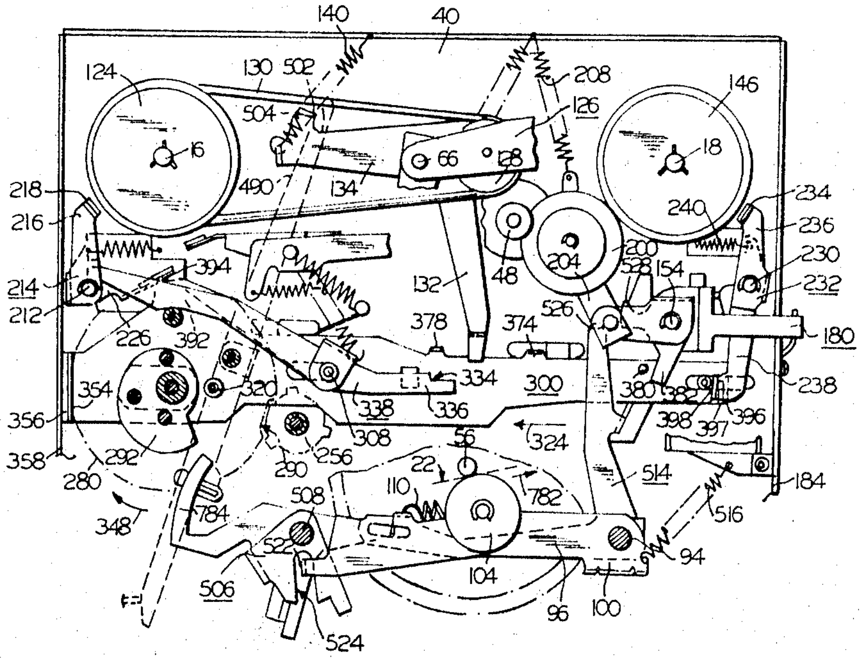
FIG. 37 is a fragmentary plan view similar to that of FIG. 7 showing the parts in the "play" position.

Said third control lever 514 is biased counter-clockwise about the shaft 94 by the action of a spring 516, connected between said third control lever 514 and the main chassis 40. As a result, said second control lever 506 is biased clockwise about the shaft 508 and a projection 518 on the lower part of said second control lever 506 pushes against the arm 480 of said third lever 475 as shown in FIG. 21. Since the springs 484 and 516 are arranged in such a way that the pivotal force of said lever 476 is greater than that of said second control lever 506, when the "play" key 34 is not depressed lever 476 pivots clockwise (FIG. 21) due to the action of spring 484. Accordingly, said second control lever 506 is in a position to pivot as far as possible in a counter-clockwise direction as shown in FIG. 7. The upper portion of said second control lever 506 is provided with stepped portions 520 and 521 which latch with a bent down tab 522 at one end of the first arm 96 of said lever 100, in order to intermit the clockwise rotation of said lever 100 around shaft 94 and to prevent the pinch roller 104 from being pushed against the capstan 56. Said upper portion of said second control lever 506 is also provided with a cut-out portion 524 which allows the lever 100 to rotate clockwise. Therefore, said lever 468 pivots clockwise, through a predetermined angle, about the shaft 464, as shown in FIG. 36, when the "play" key 34 is depressed. Said lever 476 pivots in association with the second lever 468 and said second control lever 506 pivots clockwise about said shaft 508 from the position shown in FIG. 7 to a position in which the cut-out portion 524 opens toward the bent tab 522 on the first arm 96 of the lever 100. Therefore, the force of spring 110 causes said lever 100 to rotate clockwise about the shaft 94. Said rotation is not interrupted by said second control lever 506. The pinch roller 104 is pressed against the capstan 56 when the driving element 300 moves in the direction of arrow 324 as shown in FIG. 37. The tape 22, pressed between said capstan 56 and the pinch roller 104, moves at a predetermined speed in accordance with the rotation of the capstan 56.

On the other hand, said third control lever 514 also pivots counter-clockwise (FIG. 7) about the shaft 94, through a predetermined angle, in association with the rotation of said second control lever 506. As a result, a bent tab 526 on one end of said control lever 514 is spaced sufficiently from a projection 528 on the lever 188 so as not to prevent said lever 188 from pivoting clockwise about the shaft 154 of the first lever 188.

A projection 530 on the third control lever 514 (FIG. 11) moves to a position 530*a*, indicated by the broken line, but does not push against the tab 388 of the member 160. When the driving element 300 moves in the direction indicated by the arrow 324, as shown in FIG. 7, and when the pin 380 moves away from the driven arm 382 of the first lever 188, the first lever 188 pivots clockwise about the shaft 154 under the bias of the spring 208 so as to bring the idler wheel 200 into an engagement between the stepped section 76( FIG. 9) of the driving pulley 48 and the lower take-up reel roller 148 (FIG. 9). Consequently, the rotational motion of the motor 44 is transmitted to the take-up reel rollers 146 and 148 which cause the tape 22 to be wound around the take-up reel 14.

Figure 12:
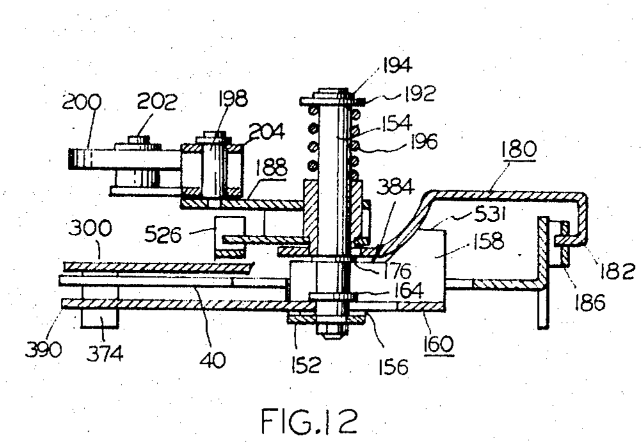
FIG. 12 is a longitudinal sectional view on an enlarged scale taken along the line 12—12 of FIG. 7.
Figure 41:
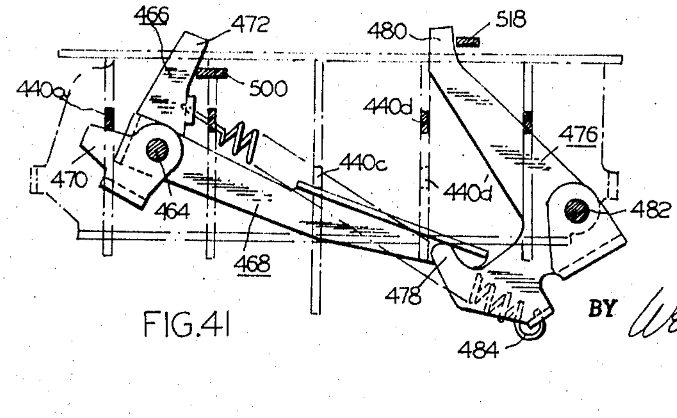
FIG. 41 is a view similar to that of FIG. 21 showing the "fast-forward" key when depressed.

As shown in FIG. 41, when the "fast-forward" key 34 is depressed, the clockwise rotation about shaft 464 of the lever 468 is greater than that when the "play" key 34 is depressed. The lever 476 pivots in association with the lever 468 and said second control lever 506 pivots clockwise about said shaft 508 from the position of FIG. 7 to a position in which the stepped portion 521 faces the bent tab 522 of the first arm 96 of the lever 100. Therefore, the stepped portion 521 of the second control lever 506 prevents said lever 100 from rotating clockwise about the shaft 94 when the driving element moves in the direction indicated by the arrow 324. On the other hand, said third control lever 514 is coupled with the second control lever 506 and pivots counter-clockwise about the shaft 94 through a larger angle in the case of FIG. 7 than that when the "play" key 34 is depressed. The bent tab 526 at one end of the third control lever 514 is sufficiently spaced from the projection 528 on the first lever 188 so as not to prevent the first lever 188 from rotating clockwise about the shaft 154. The projection 530 on the third control lever 514 of FIG. 11 moves to a position 530*b*, indicated by the broken line. In so doing it pushes the tab 388 of member 160 and causes said member 160 to pivot clockwise about the shaft 154 so as to position same member 160 at the position indicated by the broken line. When said member 160 is in said position and when said driving element 300 moves in the direction shown by the arrow 324, the lug 374 of said driving element 300 engages with the hook 390 of said member 160 and moves said member 160 along the slot 162 in the direction of the arrow 324 and in opposition to the force of the spring 70. Such movement causes the upper step 531 of the cam portion 158 of said member 160 to push the subsidiary plate 180 upward as shown in FIG. 12. Consequently, the first lever 188 is also pushed upward in opposition to the force of the compression spring 196 and the idler wheel 200 is lifted up to a height corresponding to that of the stepped section 210 of the driving pulley 48 and the upper take-up reel roller 146, as shown by the broken line in FIG. 9.

On the other hand, the first lever 188 rotates clockwise about the shaft 154 under the bias of the spring 208, as seen in FIG. 37, in accordance with the movement in the direction of arrow 324 of the driving element 300 so as to make the idler wheel 200 engage between the stepped section 210 (FIG. 9) of the driving pulley 48 and the upper take-up reel roller 146 (FIG. 9). The rotational motion of the motor 44 is directly transmitted to the upper take-up reel roller 146, which causes the tape 22 to be wound-up on the take-up reel 14.

Figure 18:
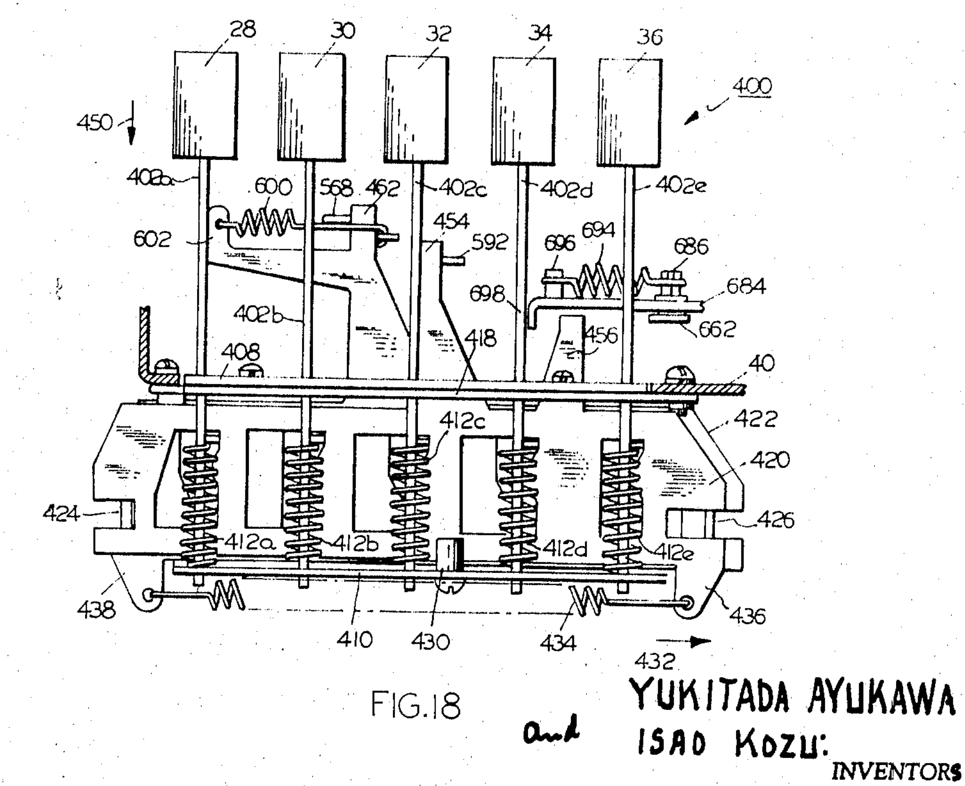
FIG. 18 is a longitudinal sectional view of the selection means taken along the line 18—18 of FIG. 17.
Figures 19, 20:
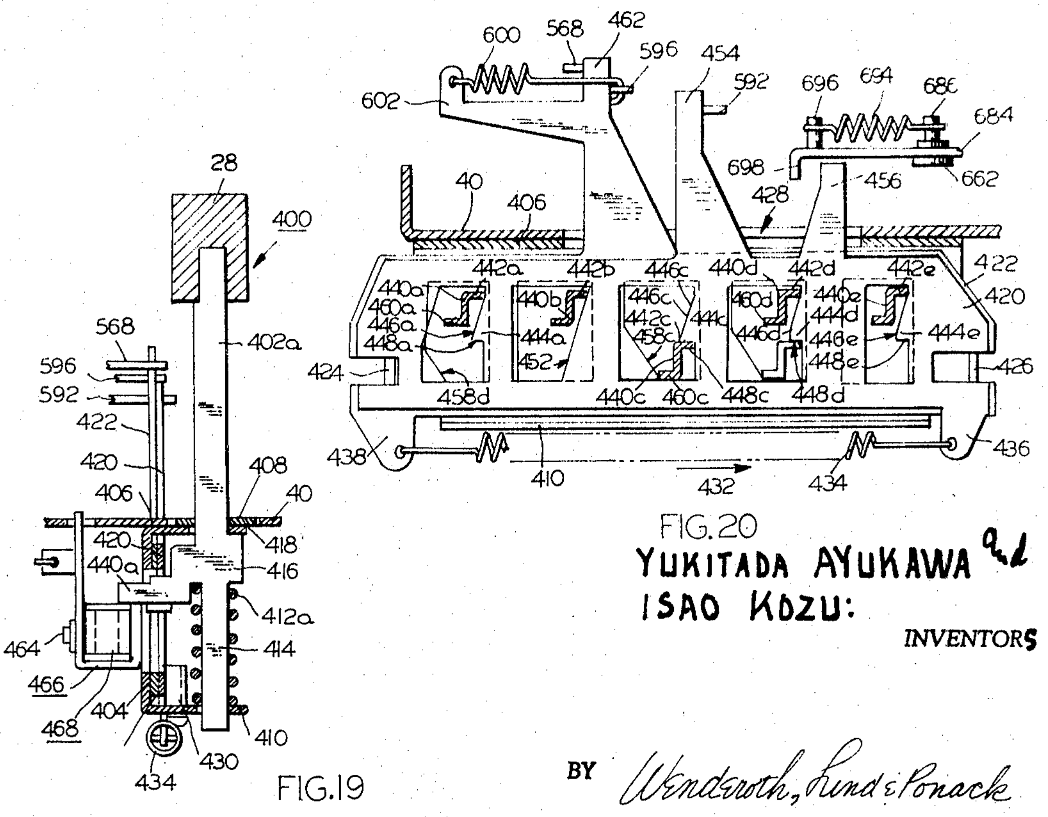
FIG. 19 is a transverse sectional view taken along the line 19—19 of FIG. 17.
FIG. 20 is a longitudinal sectional view taken along on the line 20—20 of FIG. 17.

When the "record" key 36 of FIG. 18 is depressed, said "record" key 36 is latched in the depressed state by the sliding latch plate 420 in a way similar to that when the play key 34 is depressed.

The electrical circuit for the recording and the reproducing amplifiers is switched from the reproducing of the "record" key 36 by using a conventional switching device which is well known in the tape recorder art. When the "record" key 36 and the "play" key 34 are depressed at the same time, the capstan 56 and the pinch roller 104 move the tape 22 at a predetermined speed in association with the depression of the "play" key 34 and the electric circuit for the recording and the reproducing amplifiers is simultaneously switched to the recording state in association with the depression of the "record" key 36. Consequently, the signal is recorded on the tape by the magnetic head 120.

With reference to FIGS. 13 to 15, 24 to 26 and 38 to 40, a detailed description will be made of the clutch means which intermit the driving power between the driving means and the motor when the selection means are operated.

Referring to FIGS. 13 and 14, a first clutch device 532 is pivotally mounted on a shaft 534 which is secured to said mutilated gear 280 in the vicinity of the first toothless section 288. Said first clutch device 532 is provided with a lug 536, which is turned upward and is engageable with the claws 254 of the claw plate 256; with a lug 538, which is turned upward and is actuated by a clutch actuating device, illustrated hereinafter; and with a tab 540, which extends downward through an opening 542 of said gear 280, and which has one end of a spring 544 connected thereto. The other end of said spring is connected with the stay pole 294. Said first clutch device 532 is rotated counter-clockwise about the shaft 534 under the bias of said spring 544 and said lug 536 is positioned such that it does not engage with said claws 254. A second clutch device 546 having a shape similar to that of said first clutch device 532 is pivotally mounted on a shaft 548 secured to said gear 280 in the vicinity of the second toothless section 290. Said second clutch device 546 is provided with a lug 550, which is turned upward and which is capable of engaging with said claws 254; with a lug 552, which is turned upward so as to be actuated by a clutch actuating device illustrated hereinafter and which is higher than said lug 538 of the first clutch device 532; and with a tab 554 which extends downward through an opening 556 in said gear 280 and which has one end of a spring 558 connected thereto, the other end of which is connected with the stay pole 296. Said second clutch device 546 rotates counter-clockwise about the shaft 548 under the bias of the spring 558. Even when the second toothless section 290 of said gear 280 is positioned so as to face the pinion 258, said lug 550 is positioned so as not to engage with said claws 254.

Figure 24:
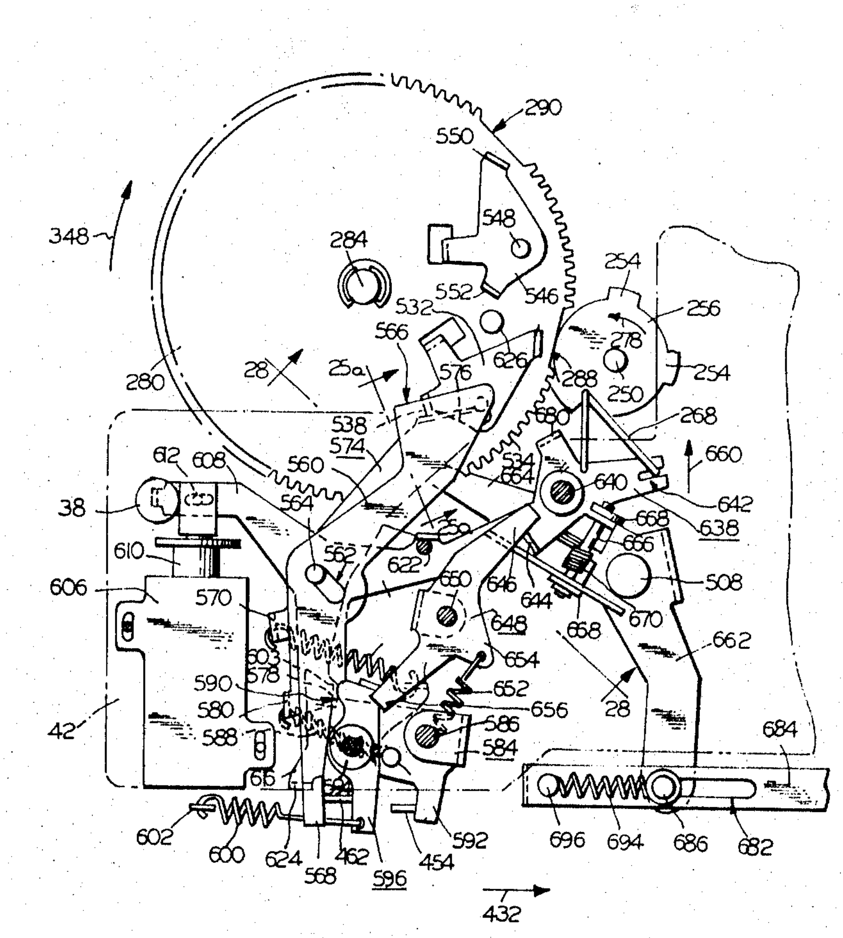
FIG. 24 is a plan view of the clutch means with the upper chassis removed for clarity, showing the mutilated gear and clutch means in a "stop" position.
Figure 25A:
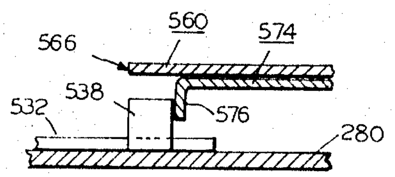
FIG. 25*a* is a sectional view of the clutch means taken along the line **25*a*—25*a*** of FIG. 24.
Figure 25B:
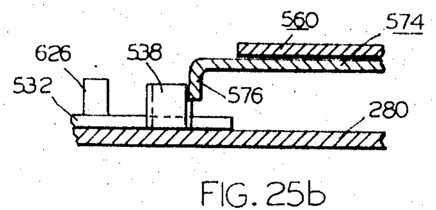
FIG. 25*b* of a sectional view of the clutch means taken along the line **25*b*—25*b*** of FIG. 38.
Figure 25C:
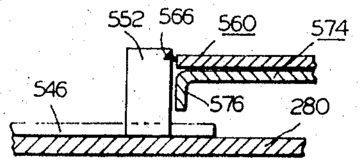
FIG. 25*c* is a sectional view of the clutch means taken along the line **25*c*—25*c*** of FIG. 39.
Figure 25D:
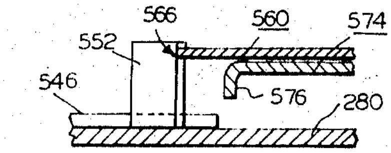
FIG. 25*d* is a sectional view of the clutch means taken along the line **25*d*—25*d*** of FIG. 40.
Figure 25E:
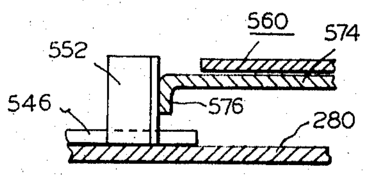
FIG. 25*e* is a sectional view of the clutch means taken along the line **25*e*—25*e*** of FIG. 43.
Figure 26:
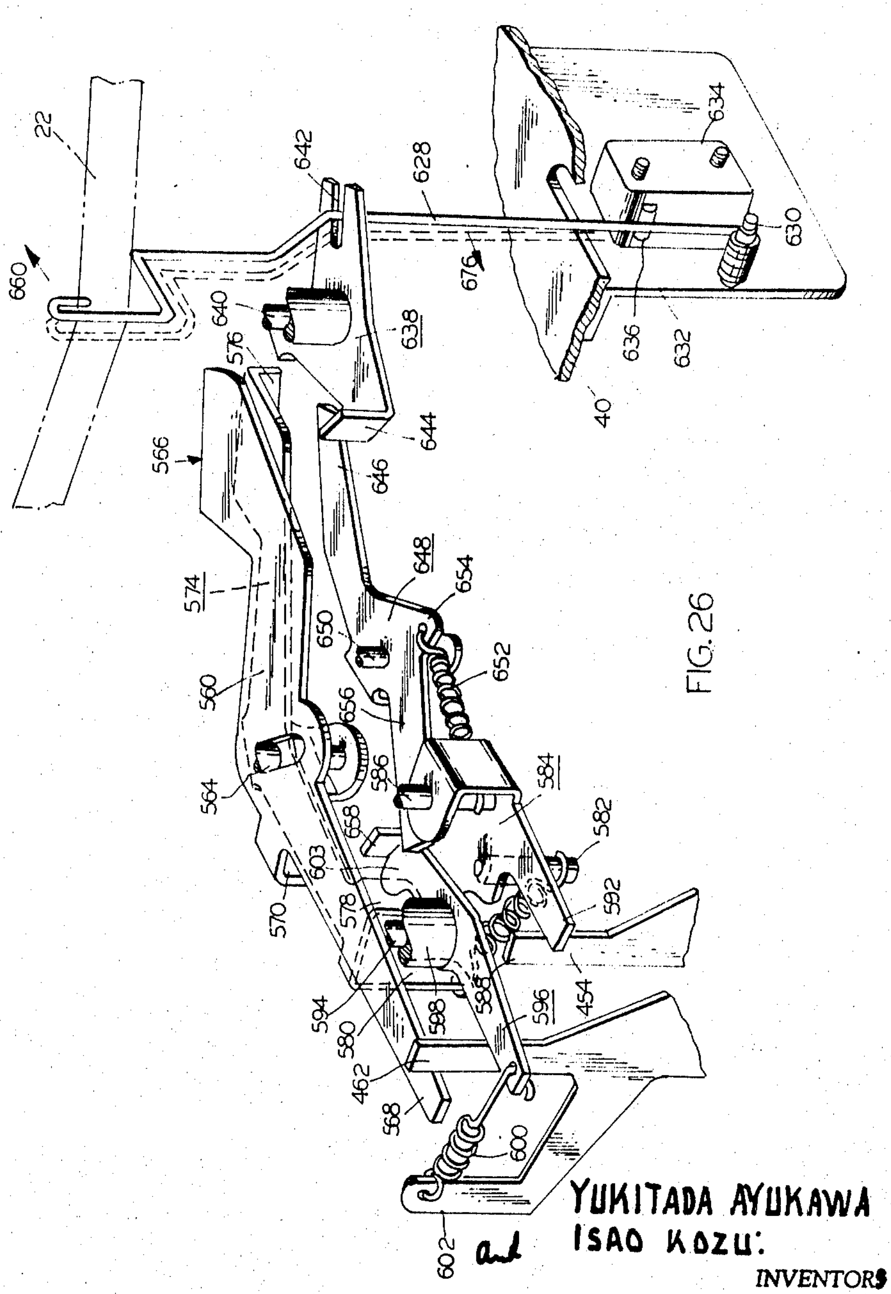
FIG. 26 is a perspective view of a part of the clutch means and the automatic stop means with the upper chassis removed for clarity.

Referring to FIGS. 24–26, a second clutch actuating device 560 designed to actuate said second clutch device 546, is pivotally mounted on a shaft 564 which is secured to the lower face of said upper chassis 42 by having said shaft 564 positioned in a slot 562. Said second clutch actuating device 560 is provided with an actuating edge 566 which is engageable with the lug 552 of said clutch device 546; with an arm 568 which is driven by the projection 462 (FIG. 20) of said sliding actuating plate 422; and with a tab 570 which is turned downward. A spring 572, connected to said tab 570, biases said second clutch actuating device 560 in a counter-clockwise direction so as to cause it to push an arm 568 against said projection 462 of the sliding actuating plate 422. A first clutch actuating device 574, which actuates both said first clutch device 532 and said second clutch device 546, is pivotally mounted on said shaft 546 beneath said second clutch actuating device 560. Said first clutch actuating device 574 is provided with an actuating edge 576 which is engageable with both the lug 538 of said first clutch device 532 and the lug 552 of said second clutch device 546. It is further provided with a lug 578 and a tab 580 which are turned downward. A spring 588 is connected between said tab 580 and a fixed pin 582 positioned on a trigger lever 584 which is pivotally mounted on a shaft 586 which is secured to the lower face of the upper chassis 42. Said spring 588 biases said first clutch actuating device 574 so that it rotates counter-clockwise about the shaft 546. Said first clutch actuating device 574 is usually latched by a stepped portion 590 of said trigger lever 584 so as to be limited in the distance through which it can pivot. Said trigger lever 584 has an arm 592 driven by the projection 454 of said sliding latch plate 420 (FIG. 20). A shaft 594, secured to a lever 596, is inserted into a bearing 598 on the lower face of said upper chassis 44. Said lever 596 rotates freely about said shaft 594 and is pushed, at one end, against the projection 462 of said sliding actuating plate 422 by the force of a spring 600 which is connected between said lever 596 and a projection 602 of said plate 422 (FIG. 20).

Another projection 603 of said lever 596 is pushed against a lug 578 of said first clutch actuating device 574 and as a result, it restricts the rotation of said device 574 in a counter-clockwise direction (FIG. 24) when none of the keys of the selection means are depressed. In this case, the actuating edge 566 of said first clutch actuating device 574 does not push against the lug 538 of the first clutch device 532. The actuating edge 566 of the second clutch actuating device 560 is positioned above the lug 538 of the first clutch device 532, as shown in FIG. 25*a*, and does not cause said first clutch device 532 to rotate clockwise (FIG. 24). Said lug 536 of said device 532 (FIG. 24) does not engage with claws 254 of the claw plate 256.

Figure 38:
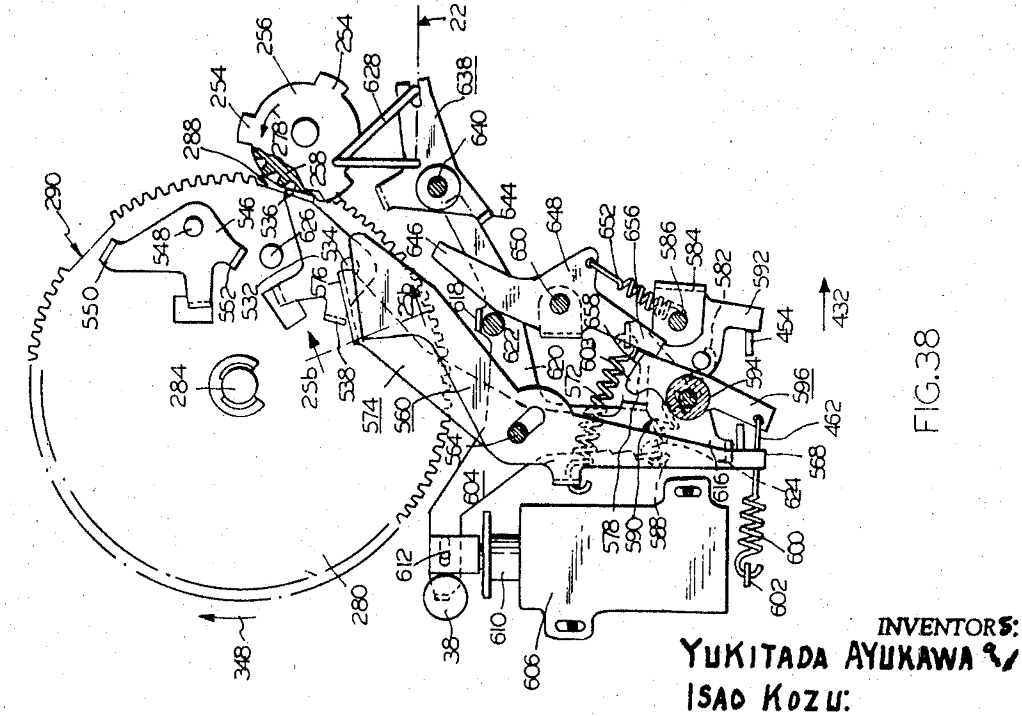
FIG. 38 is a plan view similar to that of FIG. 24 showing the position of the clutch means after said means are actuated.

Referring to FIG. 18, when the "rewind" key 28, the "fast-forward" key 32 or the "play" key 34 is depressed, the sliding actuating plate 422 moves in a direction opposite to the direction of the arrow 432 in such a way that the projection 462 of said plate 422 pushes the arm 568 of the second clutch actuating device 560 in a direction opposite to the direction of arrow 432 and rotates the device 560 clockwise about the shaft 564. In accordance with the movement of the projection 462 of said plate 422, the lever 596 pivots clockwise about the shaft 594, under the bias of the spring 600, so as to separate the projection 603 from the lug 578 of the first clutch actuating device 574. On the other hand, the depression of said keys 28, 32 or 34 causes the sliding latch plate 420 to move a predetermined distance in the direction of the arrow 432 and to immediately move back in the direction opposite to the direction of said arrow 432. Therefore, projection 454 of said sliding latch plate 420 pushes against arm 592 of said trigger lever 584, thus causing said trigger lever to pivot counter-clockwise about the shaft 586 as shown in FIG. 38. The lug 578 of the first clutch actuating device 574 is unlatched from the stepped portion 590 of said lever 584 and then said device 574 pivots counter-clockwise about the shaft 564 under the bias of the spring 588 so that the actuating edge 576 of said device 574 pushes the lug 538 of said first clutch device 532. This condition will be understood by viewing FIG. 25*b* which illustrates the side view.

Figure 39:
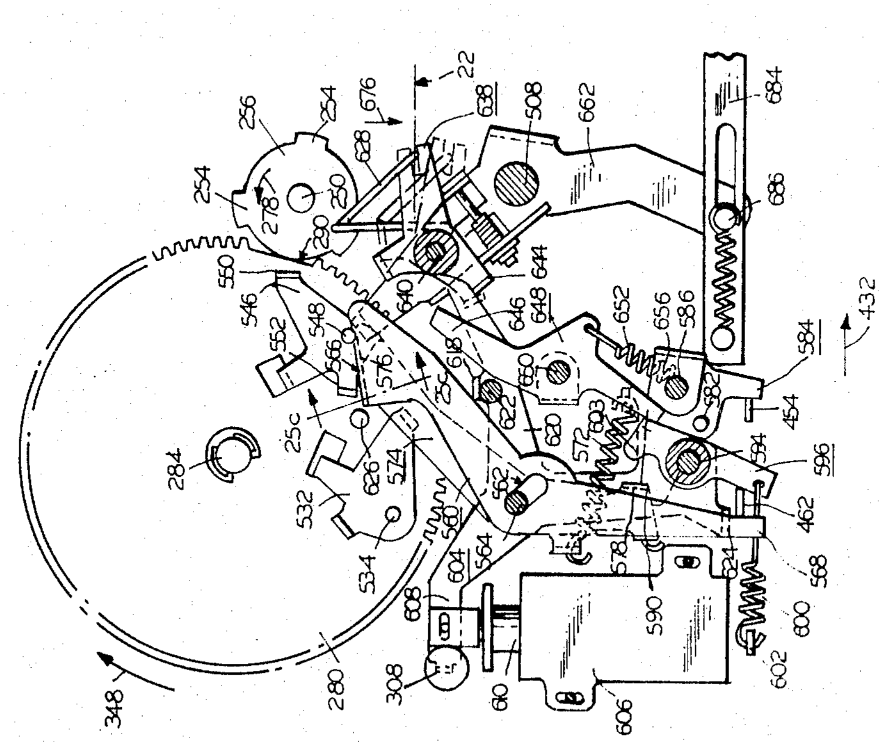
FIG. 39 is a plan view similar to that of FIG. 24 showing the multilated gear in its second stop position.

Referring to FIG. 38, said first clutch device 532 is rotated clockwise about the shaft 534 by the force against the lug 538, thus causing another lug 536 to move into a position to engage with the claws 254 of the rotating claw plate 256. Said claws 254, which are rotating in the direction of the arrow 278, push against the lug 536 of said first clutch device 532 and cause the mutilated gear 280 to rotate through a slight angle in the direction of the arrow 348. Such rotation causes the mutilated gear 280 to mesh with the pinion 258 in such a way that said gear 280 rotates in the direction of the arrow 348 from its first stop position to its second stop position. In said second stop position, the second toothless ection 290 face said pinion 258. FIG. 39 illustrates the condition in which said gear 280 is positioned at the second stop position and the tape recorder is in a position of "rewind," "fast-forward" or "play."

The actuating edge 576 of the first clutch actuating device 574 is pushed by a reset pin 626, secured to said gear 280, during the rotation of said gear 280 from its first stop position to its second stop position. Subsequently, said device 574 rotates clockwise about the shaft 564 so as to latch the lug 578 by the stepped portion 590 of the trigger lever 584. The lug 552 of the second clutch device 546 is not positioned to be pushed against the actuating edge 576 of the first clutch actuating device 574. Likewise, when the second clutch actuating device 560 is in a position to rotate clockwise about the shaft 564, said lug 552 is not pushed against the actuating edge 566. This will be clearly understood from FIG. 25*c*.

Figure 40:
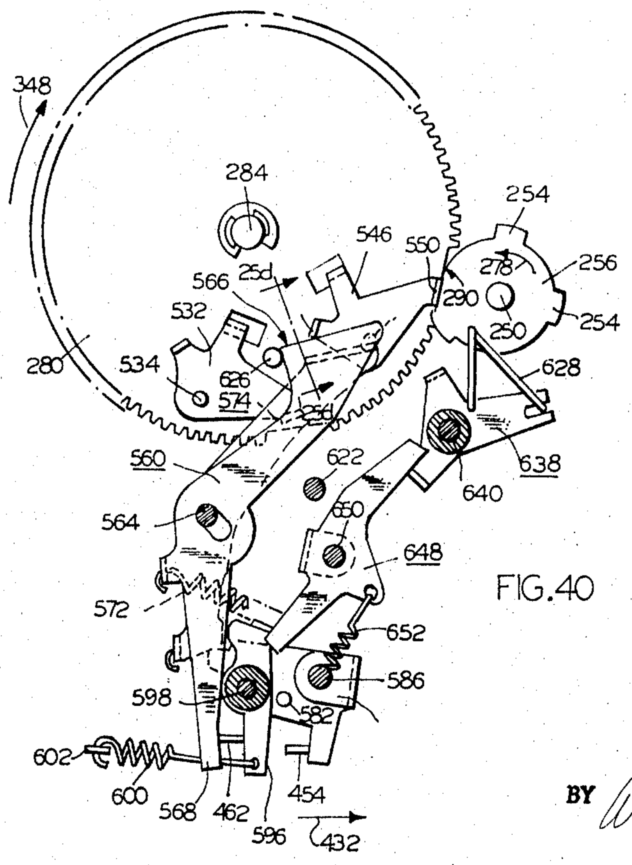
FIG. 40 is a plan view similar to that of FIG. 39 showing the position of the clutch means after it is actuated by the stop key.

When the tape recorder is in the position illustrated in FIG. 39, while lug 550 is out of engagement with the claws 254 of the claw plate 256, the second clutch device 546 rotates counter-clockwise about the shaft 548 under the bias of the spring 558 (FIG. 13). When the "stop" key 30 of FIG. 18 is depressed, keys 28, 32, 34 and/or 36, which have been depressed and latched, return upward due to the movement of the sliding latch plate 420 in the direction of said arrow 432. In accordance with the return of said keys 28, 32, 34 and/or 36, the sliding actuating plate 422 moves in the direction of the arrow 432 under the bias of the spring 434. When the projection 462 of said sliding actuating plate 422 moves in the direction of the arrow 432, as shown in FIG. 40, the second clutch actuating device 560 rotates, under the bias of the spring 572, counter-clockwise about the shaft 564 and causes the actuating edge 566 to push against the lug 552 of the second clutch device 546. This will be clearly understood by referring to FIG. 25*d*. When said second clutch device 546 rotates clockwise about the shaft 548, lug 550 is positioned to be engaged by the claws 254 of the claw plate 256. Where, when said claw plate 256 rotates in the direction of the arrow 278, one of the claws 25*a* pushes against the lug 550 of said device 546 so as to make said gear 280 rotate slightly in the direction of arrow 348. This causes said gear 280 to mesh with the pinion 258 and to rotate up to its first stop position in the direction of arrow 348. The return of said keys 28, 32, 34 and/or 36 to their upward position is accompanied by projection 454 of the sliding latch plate 420 returning to its original position. As a result, the trigger lever 584, in FIG. 24, rotates counter-clockwise about the shaft 586 so as to separate the stepped portion 590 from the lug 578 of the first clutch actuating device 574. In accordance with the return of the projection 462 of the sliding actuating plate 422 in the direction of arrow 432, the lever 596 pivots counter-clockwise about the shaft 594 and the projection 603 engages the lug 578 of said first clutch actuating device 574 so as to prevent said device 574 from rotating counter-clockwise about the shaft 564.

The following description will explain means for actuating said clutch device in order to change from a "play," "record," "fast-forward" or "rewind" condition to an "instant stop" condition.

Figure 27:
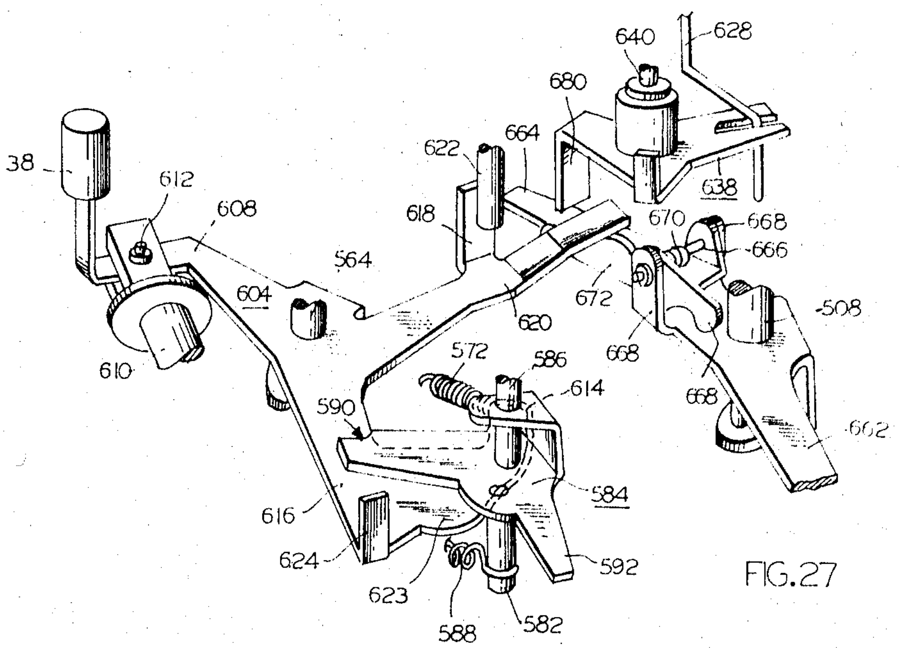
FIG. 27 is a perspective view of a part of the clutch means, clutch actuating means and automatic stop means with certain parts removed for the purpose of clarity.

Referring to FIGS. 24 and 27, a third clutch actuating device 604, which is driven by a solenoid 606, is pivotally mounted on the shaft 564 below said first clutch actuating device 574. A first arm 608 of said third clutch actuating device 604 is connected with a plunger 610 of said solenoid 606 through a pin 612. A tab 614, turned upward from a second arm 616 of said device 604, is connected with one end of the spring 572. The other end of said spring is connected with the tab 570 of said second clutch actuating device 560. Said device 604 is biased clockwise about the shaft 564 by said spring 572 but is restricted in its rotation in that direction by a lug 618 which is turned upward from a third arm 620 of said device 604. Said lug 618 pushes against a stop pin 622 secured to the lower face of the upper chassis 42. A cam portion 623, formed at one end of said second arm 616 of said device 604 of FIG. 27, is engageable with the fixed pin 582 of said trigger lever 584.

Figure 44:
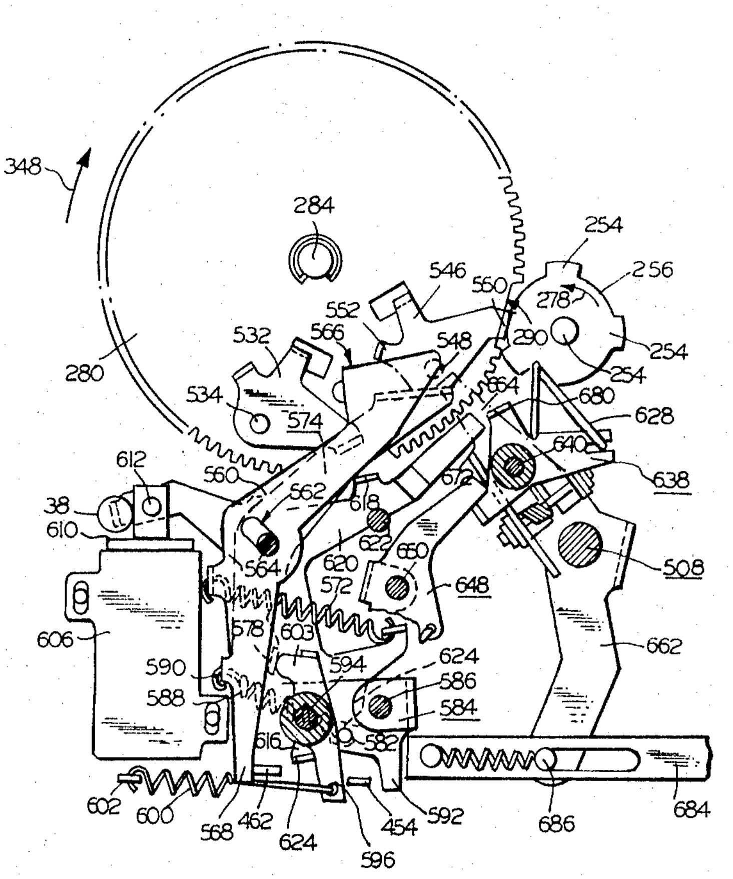
FIG. 44 is a plan view similar to that of FIG. 39 showing the position of the clutch means after it is actuated by the solenoid.

An operator can actuate the knob 38 (FIG. 1) which is fixed to one end of the first arm 608 of the third clutch actuating device 604, in order manually to pull the plunger 610 counter-clockwise about the shaft 564, as shown in FIG. 44, when the mutilated gear 280 stops at its second stop position. Alternately the solenoid 606 can be energized to accomplish the same movement. This has the effect of bringing the tape recorder into a "play," "record," "fast-forward" and "rewind" condition. In such a case, said cam portion 623 of said device 604 pushes the fixed pin 582 of said trigger lever 584 and causes said trigger lever 584 to pivot counter-clockwise about the shaft 586. At the time the lug 578 of said first clutch actuating device 574 is unlatched from the stepped portion 590 of said trigger lever 584 so that the first clutch actuating device 574 begins pivoting counter-clockwise about the shaft 564 under the bias of the spring 588. However, a lug 624, extending upward from the second arm 616 of said third clutch actuating device 604, pushes against and causes the lever 596 to pivot counter-clockwise about the shaft 594. Said projection 603 on the lever 596 retains the lug 578 of said first clutch actuating device 574 and prevents said device 574 from rotating counter-clockwise.

With the rotation of the third clutch actuating device 604 in a counter-clockwise direction, the lug 618 of the third arm 620 pushes against and causes the second clutch actuating device 560 to move along the slot 562 as shown in FIG. 44. Therefore, the actuating edge 566 of said device 560 pushes against and causes the lug 552 of the second clutch device 546 to rotate clockwise about the shaft 548. One of the claws 254 of the claw plate 256, while rotating in the direction of the arrow 278, pushes against the lug 550 of said second clutch device 546 and causes the gear 280 to rotate slightly in the direction of the arrow 348. Because of this rotation, the gear 280 meshes with the pinion 258 to rotate to its first stop position. This rotation causes said driving means to be driven in order to accomplish the "stop" condition of the tape recorder.

When the operator removes his hand from the knob 38 or switches the solenoid 606 off, the third clutch actuating device 604 rotates clockwise about the shaft 564 under the bias of the spring 572 so as to return to the position shown in FIG. 38. Since the lug 624 of the second arm 616 of said device 604 moves away from the lever 596, the lever 596 rotates clockwise about the shaft 594 under the bias of the spring 600 so that the projection 603 of said lever 596 moves away from the lug 578 on the first clutch actuating device 574. Therefore, said first clutch actuating device 574 rotates counter-clockwise about the shaft 564 under the bias of the spring 588. This causes the actuating edge 576 to push the lug 538 of the first clutch device 532 so that the first clutch device 532 rotates clockwise about the shaft 534. While the claw plate 256 is rotating in the direction of the arrow 278, one of the claws 254 of said claw plate 256 engages the lug 536 of said device 532, thus causing the gear 280 to mesh with the pinion 258. As a result, the gear 280 starts to rotate from its first stop position to its second stop position in the direction of arrow 348. Said driving means operates to position the tape recorder in "play," "record," "fast-forward" or "rewind" condition when the respective key 28, 32, 34 or 36 is positioned in a depressed position.

The lug 618 on the third arm 620 of the third clutch actuating device 604 rotates so as to push against the stop pin 622 before the gear 280 is positioned at its second stop position as shown in FIG. 39. As a result, the second clutch actuating device 560 moves along the slot 562 under the bias of the spring 572 to the position shown in FIG. 39. Said movement is carried out so as not to press the actuating edge 566 against the lug 552 of the second clutch device 546. The lug 578 of said device 574 is latched by the stepped portion 590 of the trigger lever 584 in such a way that the actuating edge 576 of the first clutch actuating device 574 is pushed by the reset pin 626. The actuating edge 576 of the first clutch actuating device 574 does not push against the lug 552 of the second clutch device 546.

The following will describe means for detecting whether or not the tape is in a predetermined path when the tap recorder is in a state of "play," "record," "fast-forward" or "rewind." It will also describe automatic stop means capable of automatically bringing the tape recorder to a "stop" condition in response to the above detecting means.

The tape guiding path 27 in FIG. 1 is provided with a detecting rod 628 (FIG. 2) for detecting the presence of the tape. Such construction will be explained more exactly with reference to FIG. 26. A coil shaped portion of said detecting rod 628 is pivotally mounted on a horizontal shaft 630 which is fixed to a bracket 632 which is also secured to the main chassis 40 in such a way that said detecting rod can pivot in the direction of arrow 660. Said bracket 632 is provided with a normally closed micro-switch 634 which controls the current to said solenoid 606. When the tape 22 is in the tape guiding path 27, said detecting rod 628 pushes a push button 636 of said micro-switch 634 so as to cut off the current for said solenoid 606.

Referring to FIGS. 24 and 26, a lever 638 is pivotally mounted on a shaft 640, secured to the lower face of the upper chassis 42, and is rotatable in association with the rotation of said rod 628, which extends through a slot 642 of said lever 638. A lug 644 upturned from the end of said lever 638 engages with a first arm 646 of a lever 648 which is rotatably mounted on a shaft 650 secured to the lower face of the upper chassis 42. Said lever 648 is designed to rotate clockwise about the shaft 650 under the bias of a spring 652 which in turn is connected between a tab 654 on said lever 648 and said shaft 586. A second arm 656 of said lever 648 bears against a lug 658 upturned from the end of the lever 596. When none of the keys of the selection means are depressed, spring 652 causes said lever 648 to pivot clockwise through the largest angle possible in such a way that the first arm 646 of said lever 648 pushes against the lug 644 of the lever 638 and causes said lever 638 to pivot counter-clockwise about the shaft 640 so as to move said detecting rod 628 in the direction of arrow 660, as shown in FIG. 24. Therefore, said rod 628 does not interfere with putting the tape 22 in or taking it out of the tape guiding path 27 (FIG. 1).

Figure 28:
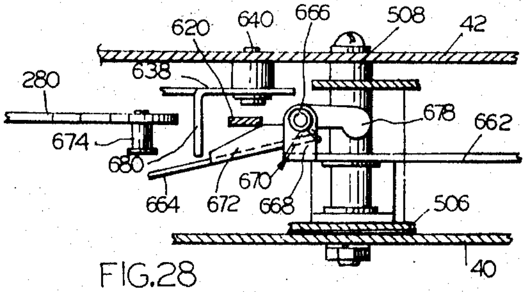
FIG. 28 is a sectional view of a part of the automatic stop means taken along the line 28—28 of FIG. 24.
Figure 29:
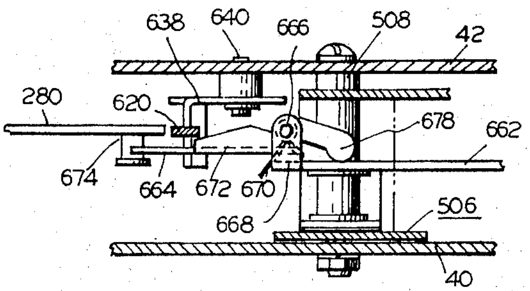
FIG. 29 is a view similar to that of FIG. 28 after the automatic stop means have been operated.

Referring to FIGS. 24 and 27 to 29, a lever 662 is pivotally mounted on a shaft 508. A rocker arm 664 is rotatably mounted for movement in a vertical direction on a horizontal shaft 666 which is supported by two tabs 668 upturned from the end of said lever 662. Said rocker arm 664 is supplied with rotational power to rotate clockwise by the bias of a torsion spring 670 but is rotated counter-clockwise about the shaft 666 as shown in FIG. 28 by the third arm 620 of the third clutch actuating device 604 pushing a cam portion 672 on the upturned side of said rocker arm 664 when the solenoid 606 is not energized as shown in FIG. 24. Therefore, said rocker arm 664 is not driven by a pin 674, secured to the lower face of the mutilated gear 280 during the rotation of said gear 280.

When the mutilated gear 280 is in its second stop position and the tape recorder is in a "play," "record," "fast-forward" or "rewind" condition the detecting rod 628 moves in the direction of the arrow 676 so as to occupy the position indicated by the broken line if no tape 22 is present in the tape guiding path 27 (FIG. 1). The lever 596 rotates clockwise under the bias of the spring 600 in accordance with the movement of the projection 462 of the sliding actuating plate 422. As a result, the lugs 658 of said lever 596 pushes against the second arm 656 of the lever 648 and causes it to pivot counter-clockwise about the shaft 650 against the bias of the spring 652. Since the first arm 646 of said lever 648 is separated from the lug 644 of said lever 638, said lever 638 pivots clockwise about the shaft 640 in association with said detecting rod 628 so as to occupy the position indicated by the broken lines. The force of the detecting rod 628, moving in the direction of the arrow 676, is supplied by the force of the push button 636 projecting from the micro-switch 634. This projecting of the push button 636 from the micro-switch turns the micro-switch 634 on so as to energize the solenoid 606 to pull the plunger 610 as shown in FIG. 44. As a result, the third clutch actuating device 604 rotates counter-clockwise so as to separate the third arm 620 thereof from the cam portion 672 of the rocker arm 664. Said rocker arm 664 rotates clockwise about the shaft 666 under the bias of said torsion spring 670 until the projection 668 on said arm 664 abuts the lever 662. During the rotation of the mutilated gear 280 from its second stop position to its first stop position, the pin 674, secured to said gear 280, pushes against said rocker arm 664 in such a way that the lever 662, when in the position of FIG. 39, pivots counter-clockwise about the shaft 508 so as to be positioned as indicated by FIG. 24. The lever 662, positioned as indicated by FIG. 24, holds the tape recorder, according to the present invention, in a complete stop condition as will be illustrated below.

When the tape recorder is in an operating condition and when tape is present in the tape guiding path 27 of FIG. 1, the case will occur when an operator will handle knob 38 or energize the solenoid 606 so as to pull in the plunger 610 to rotate the third clutch actuating device 604 counter-clockwise about the shaft 564 in a way such that the third arm 620 of said device 604 is separated from the cam portion 672 of said rocker arm 664. In that case, a lug 680, which is a down turned portion of lever 638, restrains the clockwise rotation of the rocker arm 664 about the shaft 668 due to the force of the torsion spring 670 and then the rocker arm 664 is not kicked by the pin which rotates in association with the gear 280.

Figure 30:
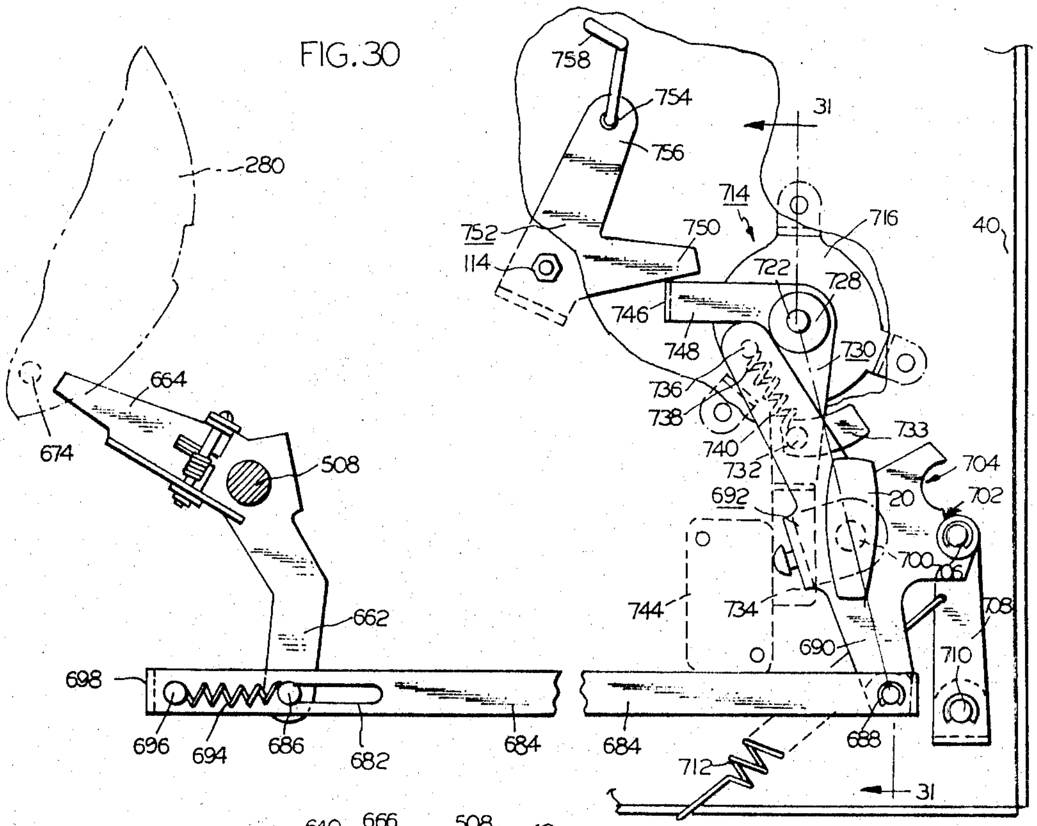
FIG. 30 is a plan view of a part of the automatic stop means with a certain part of the main chassis broken away for clarity.

Referring to FIGS. 24 and 30, a shaft 686, secured to one end of the lever 662, extends into an elongated slot 682, positioned in one end of a connecting rod 684. The other end of said rod 684 is connected to a shaft 688 which is secured to the first arm 690 of the lever 692 (FIG. 30). A strong tension spring 694 is connected between the shaft 696 on the rod 684 and the shaft 686 and urges said shaft 686 against the left end of the slot in the rod 684. When a lug 698, extending downwardly at one end of said rod 684, is positioned as indicated by FIGS. 24 and 30, said lug 698 pushes against and moves the projection 456 of the sliding latch plate 420 of the selection means in the direction of the arrow 432 in such a way that the keys 28, 32, 34 and 36 are not latched by said plate 420 even when said keys are depressed.

Figures 31, 32:
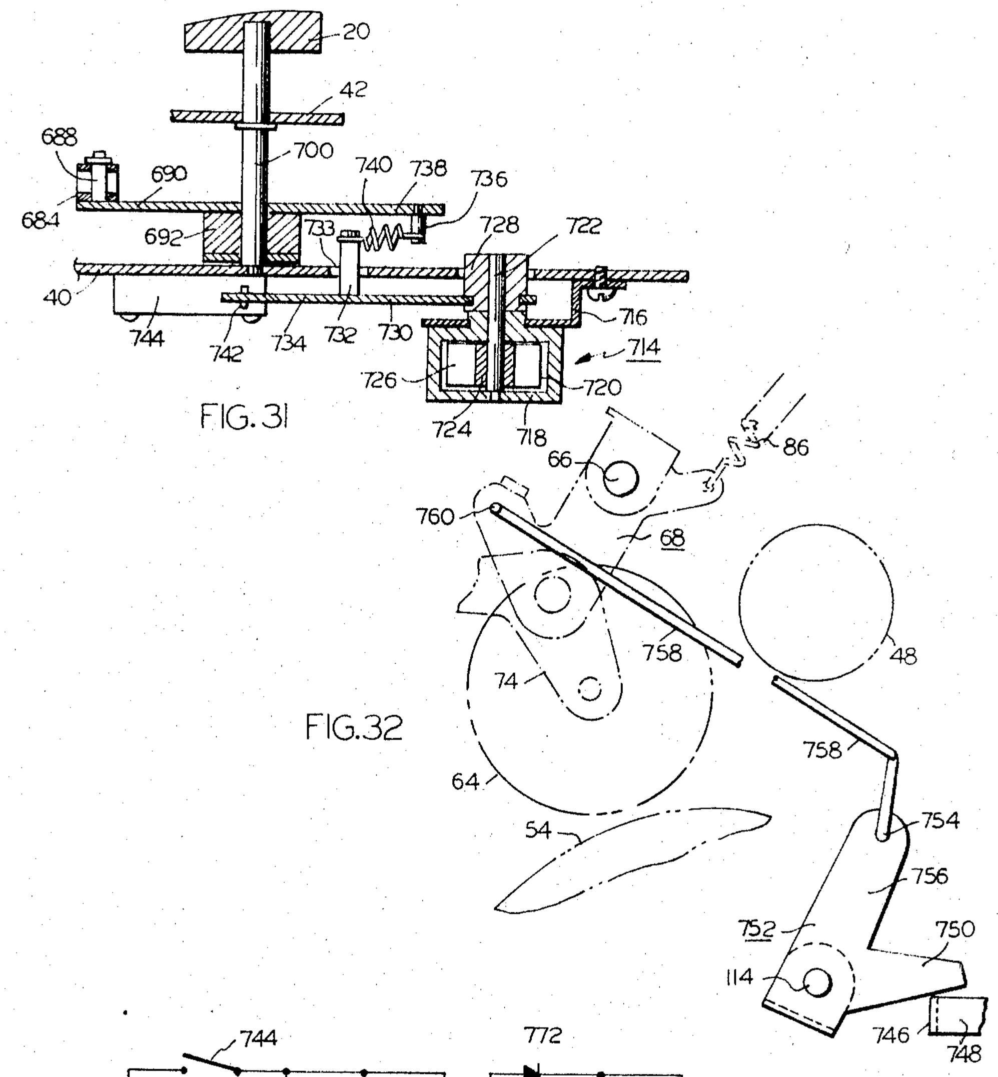
FIG. 31 is a sectional view taken along the irregular line 31—31 in FIG. 30.
FIG. 32 is a plan view of a part of the automatic stop means with the main chassis removed for clarity.

Referring to FIGS. 30 and 31, said lever 692 is secured to a shaft 700, rotatably mounted between the main chassis 40 and the upper chassis 42. The knob 20 (FIG. 1) is secured to the end of said shaft 700. A detent arm 708 is rotatably mounted on a shaft 710 which is secured to the main chassis 40. A roller 706 is rotatably mounted on the free of said detent arm 708 and is alternately positioned in detent grooves 702 and 704 of said lever 692 by the action of a spring 712 connected between said detent arm 708 and a part of the main chassis 40. The lower face of the main chassis 40 is provided with a damping device 714, comprising a bracket 716 having a case 718 secured thereto. Said case 718 contains silicon oil 720 having a viscosity of about 100 million centistokes. A blade wheel 724 having a plurality of blades 726 is secured to a shaft 722 which is rotatably mounted in said case 718. Said blade wheel 724 surrounded by the silicon oil 720 is subjected to a resistance due to the viscosity of the oil when said shaft 722 rotates. A boss 728 of a switch lever 730 is secured to the upper portion of said shaft 722. A pin 732, extending upward through an opening 733 of the main chassis 40, is secured to a first arm 734 of said switch lever 730. A spring 740 is connected between said pin 732 and a pin 736 which is secured to a second arm 738 of said lever 692. When the roller 706 of said detent arm 708 is forced into the detent groove 702 of the lever 692 as shown in FIG. 30, said pin 736 is positioned on the left side of said shaft 722. As a result, said switch lever 730 is designed to rotate clockwise about the shaft 722 under the bias of the spring 740 in such a way that the first arm 734 of said lever 730 depresses a push button 742 of a normally closed micro-switch 744 for controlling the power source for the motor and the electric circuit of this tape recorder. The depression of the push button 742 turns said micro-switch 744 off and results in a cutting-off of the supply of electric power to the motor and the electric circuit.

A lug 746, down-turned from the end of the second arm 748 of the lever 730, pushes a first arm 750 of an idler-off lever 752 which is pivotally mounted on the shaft 114, secured to the lower face of the main chassis 40, and causes said lever 752 to pivot counterclockwise about the shaft 114. One end of a rod 758 is positioned in a hole 754 located at one end of a second arm 756 of said idler-off lever 752 as shown in FIG. 32 and the other end of said rod 758 is positioned in a hole 760 located at one end of the lever 68. Therefore, the lever 68 can also be pivoted about the shaft 66, through said rod 758, in accordance with the rotation of said idler-off lever 752. When said idler-off lever 752 is pushed by the lug 746 of the switch lever 730 and is pivoted counter-clockwise about the shaft 114, as shown in FIGS. 30 and 32, the first lever 68 also pivots clockwise about the shaft 66 so as to separate the first idler wheel 64 from the driving pulley 48 and the flywheel 54.

Figure 33:
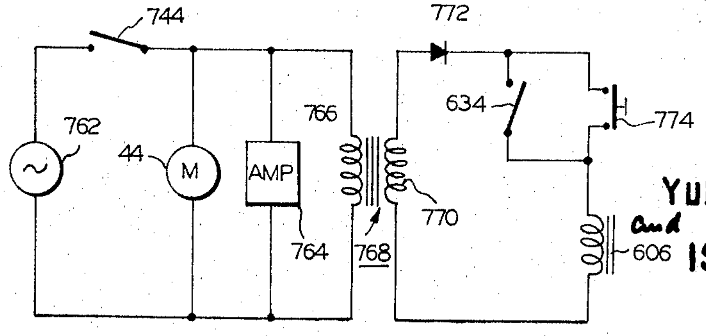
FIG. 33 is a circuit diagram of the electrical control circuits used in the tape recorder of the present invention.

The following description will explain, with reference to FIG. 33, the electric control circuits for suppling electric power to the motor, the recording and reproducing amplifiers and the solenoid of the tape recorder, according to the present invention.

An AC power source 762 supplies electric power, through the micro-switch 744, to the motor 44, the recording and reproducing amplifiers 764 and a primary coil 766 of a transformer 768. Said elements are connected in parallel with each other. A secondary coil 770 of said transformer 768 is connected, at one end, to a push button switch 724 through a rectifier 772 and, at the other end, to the solenoid 606. Said push button switch 774 is connected to said solenoid 606 and the micro-switch 634 for detecting the presence of the tape is connected in parallel to said push button switch 774. When the switch 744 is turned on it supplies electric power to the motor 44 and to the amplifiers 764. It also induces an AC voltage in the secondary coil 770 of the transformer 768. When either the micro-switch 634 or the push button switch 774 is turned on, said solenoid 606 is supplied with a DC current, said secondary current having been rectified by the rectifier 772.

A preferable construction for the push button switch 774 comprises a connector 778 and a lead wire 776 as shown in FIG. 34. The push button switch 774 is connected, at the connector 778, to the tape recorder so that an operator can easily achieve remote control of the solenoid 606 by employing said push button switch 774.

OPERATION

As seen in FIG. 1, the tape 22 is supplied to the takeup reel 14 through the tape guiding path 27 from the supply reel 12. When the operator turns the knob 20 in a clockwise direction, the lever 692, shown in FIG. 30, is swung clockwise about the shaft 700 and the roller 706 on the detent arm 708 is positioned in the detent groove 704 of said lever 692.

Figure 35:
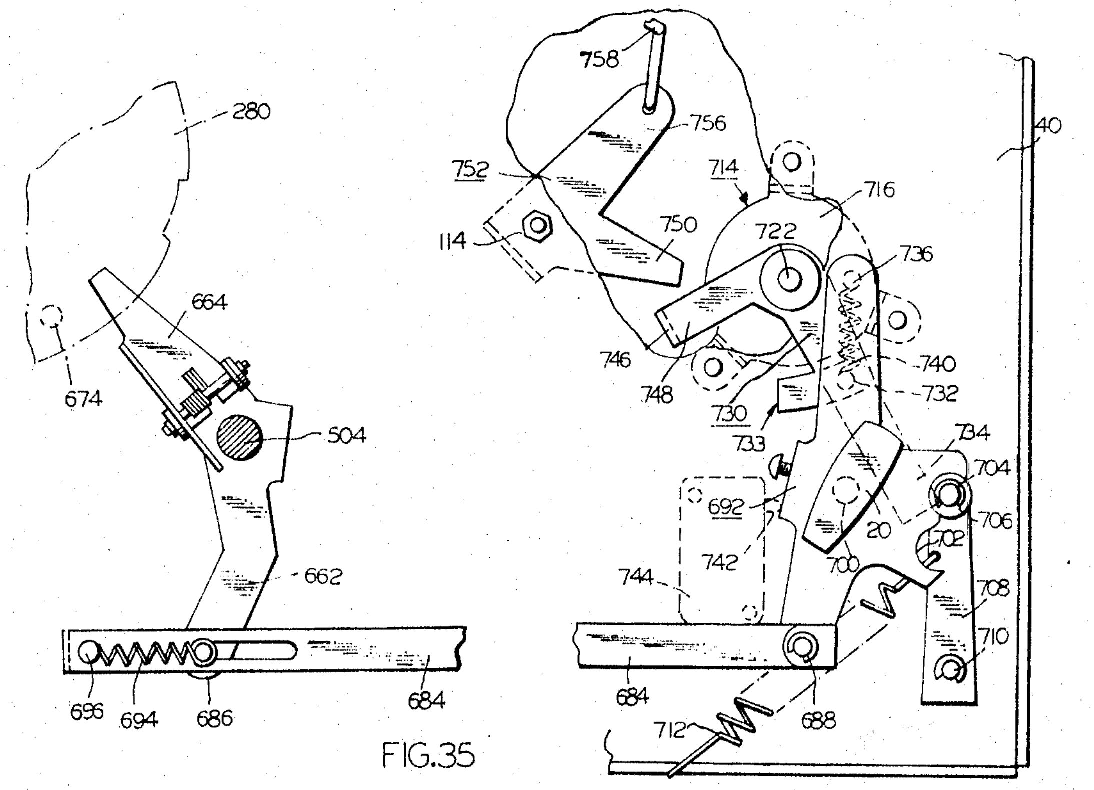
FIG. 35 is a view similar to that of FIG. 30, in which the automatic stop means are in the operating position.

As the pin 736 on said lever 692 moves to the right side of the shaft 722 as shown in FIG. 35, the switch lever 730 is gradually swung by the force of the spring 740 in a counter-clockwise direction about the shaft 722. Said swinging motion is against the resistance of the viscous damping device 714 and continues until the pin 732 on said lever 730 touches the right end of the opening 733 in the main chassis 40. When the push button 742 moves outwardly, the micro-switch 744 in FIG. 33 is turned on. At this point, AC power is supplied to the motor 44, the recording-reproducing amplifiers 764 and the transformer 768.

Referring to FIG. 35, as the lug 746 on the second arm 748 of said switch lever 730 moves away from the first arm 750 of the idler-off lever 752 due to the counter-clockwise movement of said lever 730, the idler-off lever 752 pivots in a clockwise direction about the shaft 114. Thus, referring to FIG. 32, the clockwise rotation of said lever 752 moves the rod 758 and causes the first lever 68 to rotate counter-clockwise about the shaft 66. Said lever 68 continues to swing counter-clockwise due to the biasing force of the spring 86. Accordingly, as shown in FIG. 3, the first idler wheel 64 is pushed into contact with the driving pulley 48 and the flywheel 54.

Since the driving pulley 48 rotates counter-clockwise, while AC power is being supplied to the motor, the flywheel 54 and the capstan 56 also rotate counter-clockwise due to the interaction of first idler wheel 64. Further, the second idler wheel 260 causes the second wheel 252 and the pinion 258 to rotate in the direction of arrow 278.

Referring to FIG. 35, the clockwise movement of the lever 692 is transmitted to the connecting rod 684 which in turn transmits it to the lever 662 causing said lever to swing clockwise about the shaft 508. The rocker arm 664 swings counter-clockwise about the shaft 666, as shown in FIG. 28, because the cam portion 672 is pressed down by the third arm 620 of the third clutch actuating device 604 as described above. Accordingly, said rocker arm 664 does not engage with the pin 674 on the mutilated gear 280.

Referring to FIG. 18, as the lug 698 of the connecting rod 684 moves, in accordance with the movement of said connecting rod 684 in a direction opposite to the direction of the arrow 432, away from the projection 456 of the sliding latch plate 420, said sliding latch plate can slide freely.

A detailed description will now be given of the operation of the various means of the present tape recorder as an operator operates the selection means.

The operation of the various means of the present invention will first be described with said tape recorder in the "play" position.

When the operator depresses the play key 34 in the direction of arrow 450 (FIG. 18), the bent, upper portion **442*d* of projection 440*d* on the slide plate 402*d*, shown in FIG. 20 pushes the sloping side 446*d* of the nose 444*d* of the sliding latch plate 420 and moves said plate 420 in the direction of arrow 432**.

As soon as said portion **442*d* passes below the level of the step 448*d* of the nose 444*d* of said plate 420, said sliding latch plate 420 is moved by the action of the spring 434 in the direction opposite to the direction of arrow 432. Said portion 442*d* is then latched by said step 448*d*. Accordingly, said "play" key 34** remains depressed.

Referring to FIG. 21, the projection **440*d* of the slide plate 402*d* pushes the bent portion 474 of the second lever 468 so as to impart to said lever 468 a radial movement through a predetermined angle in accordance with the movement of said "play" key 34. The positions of the parts with key 34 in the depressed position is shown in FIG. 36. In this situation the bent portion 474 of the lever 468 pushes the arm 478 of the lever 476 so as to swing said lever 476 counter-clockwise about the shaft 482. As seen in FIG. 7, this causes the arm 480 of said lever 476 to move in the direction of arrow 780 and away from the projection 518 on the second control lever 506. Accordingly, said lever 506 is swung clockwise about the shaft 508 due to the force of the spring 516 acting on the third control lever 514 pivots counter-clockwise through a predetermined angle about the shaft 94 and the bent tab 526 of said lever 514 moves away from the projection 528 on the first 188 so that it no longer engages said projection 528**.

The sloping side **458*d* of the sliding actuating plate 422, as shown in FIG. 20, is pushed by the lower bent portion 460*d* of the projection 440*d* of the slide plate 402*d* in association with the depression of said "play" key 34 and causes said plate 422 to slide in a direction opposite to the direction of arrow 432**.

As shown in FIG. 38, the projection 462 on said plate 422 pushes the arm 568 of the second clutch actuating device 560 so as to swing said device 560 in the clockwise direction about the shaft 564.

As the projection 462 of said sliding actuating plate 422 moves in the direction opposite to the direction of the arrow 432, the lever 596 is swung clockwise about the shaft 594 by the action of the spring 600 so that the projection 603 of said lever 596 moves away from the lug 578 on the first clutch actuating device 574.

The clockwise rotation of said lever 596 causes the lug 658 to push against the second arm 656 of the lever 648 and thus causes said lever 648 to swing counter-clockwise about the shaft 650 in opposition to the force of the spring 652. Said first arm 646 of said lever 648 tends to rotate clockwise but can not do so while the tape 22 prevents the detecting rod 628 from rotating.

Referring to FIG. 20, the sliding latch plate 420 moves in a reciprocating manner in the direction of arrow 432 in association with the depression of the "play" key 34 as described above. In accordance with this movement of said plate 420, the projection 454 temporarily pushes the arm 592 of the trigger lever 58A in the direction of the arrow 432. Accordingly, said trigger lever 584 pivots counter-clockwise about the shaft 586 and the lug 578 on the first clutch actuating device 574 is unlatched from the stepped portion 590 of said lever 584. Consequently, the force of the spring 588 causes said device 574 to rotate counter-clockwise about the shaft 564 and causes the actuating edge 576 of said device 574 to push against the lug 538 of the first clutch device 532 so as to rotate said device 532 clockwise about the shaft 534.

As the pinion 258 rotates in the direction of the arrow 278, one of the claws 254 of the claw plate 256, secured to said pinion 258, pushes against the lug 536 of said first clutch device 523 so as to slightly rotate the mutilated gear 280 in the direction of arrow 348. At this point, said gear 280 meshes with the pinion 258 and rotates, in the direction of arrow 384, to its second stop position, as shown in FIG. 39.

As described above, during this rotation of said gear 280, the reset pin 626 engages with and causes said first clutch actuating device 574 to rotate clockwise so that the lug 578 of said device 574 is latched by the stepped portion 590 of said trigger lever 584. During the described rotation of the gear 280, as shown in FIG. 13, the roller 344 pushes the lip 340 of the second arm 342 of the locking device 338 so as to rotate the locking device 338 clockwise about the shaft 308. Referring to FIG. 7, the lug 332 of the driving element 300 is unlatched from the stepped portion 334 of the first arm 336 of said device 338, and the driving element 300 is instantly moved under the bias of the spring 326 (FIG. 8*a*) in the direction of arrow 324 to the position shown in FIG. 37. At the same time, the projection 392 on the driving element 300 pushes the cushion plate 394 on the third arm 226 of the brake lever 214 so as to pivot said lever 214 counter-clockwise about the shaft 212. This causes the brake pad 218 on the free end of said lever 214 to be separated from the annular surface of the supply reel roller 124. Consequently, said supply reel roller 124 is free to rotate. On the other hand, the cushion plate 397 on the bent member 396 at the right-hand end of said driving element 300, pushes against the bent portion 398 of the third arm 238 of the brake lever 232 causing said lever 232 to pivot clockwise about the shaft 230. This causes the brake pad 234 on the free end of the first arm 236 of said lever 232 to move away from the annular surface of the upper take-up reel roller 146. Consequently, the upper take-up reel roller 146 is also free to rotate.

Referring to FIG. 5, the movement of the lug 374 on the driving element 300 frees the lever 116 to pivot counter-clockwise about the shaft 94 so that the lever 100 is pivoted clockwise about the shaft 94 under the force of the spring 110. This positions the pinch roller 104 so as to be in driving engagement with the capstan 56. In this situation, the bent tab 522 on the first arm 96 of said lever 100 is inserted into the cut-out portion 524 of the second control lever 506.

The tape 22, which is pressed between pinch roller 104 and the capstan 56, moves in the direction of arrow 782 at a pre-determined speed in accordance with the counter-clockwise rotation of said capstan 56.

At the same time, referring to FIG. 37, the pin 380, located on the driving element 300, separates from the arm 382 of the first lever 188 driving the movement of said element 300 in the direction of arrow 324 so that said lever 188 swings clockwise about the shaft 154 under the bias of the spring 208 which is connected to one end of the second lever 204. Accordingly, the idler wheel 200 is engaged between the stepped section 76 (FIG. 9) of the driving pulley 48 and the lower take-up reel roller 148 (FIG. 9). Consequently, the upper take-up reel roller 146 is frictionally driven by the felt ring 150 on said lower takeup reel roller 148 and rotates counter-clockwise in such a way that the take-up reel 14 winds the tape 22 which is forwarded by the capstan 56 and the pinch roller 104 (as shown in FIG. 1). Referring to FIG. 2, the tape 22 is pressed against the magnetic head 120 by the pad 122 at an appropriate pressure which is supplied through suitable means, well known in conventional tape recorders, so that the sound signal which is recorded on said tape 22 is reproduced as the tape 22 moves in the direction arrow 782.

When the "play" key 34 is depressed, the above operation is carried out during the rotation of the mutilated gear 280 from its first stop position to its second stop position. As mentioned above, the tape recorder of the present invention is designed in such manner that the rotation of said gear 280 from its first "stop" position to its second stop position requires less time than that from its second "stop" position to its first stop position. In this embodiment, the period required for the former is one sixth of the time period required for the latter. Less than three tenths of a second are required after the "play" key 34 is depressed for the present tape-recorder to accomplish the operation described above. In normal use, there is no unpleasant feeling due to a time delay in the operation of the present tape recorder when said "play" key 34 is depressed.

Next, the operation of various means will be explained for the situation when the tape recorder is changed from "play" to "stop."

When the operator depresses the "stop" key 30 in the direction of arrow 450 (FIG. 18), the upper bent portion **442*b* of the projection 440*b* of the slide plate 402*b* pushes the sloping side 452 of the sliding latch plate 420 so as to slide said plate 420 in the direction of arrow 432 (FIG. 20). This causes the upper bent portion 442*d* of the slide plate 420*d*, which has been latched by the step 448*d* of the sliding latch plate 420, to be unlatched. Accordingly, the "play" key 34 (FIG. 18) returns to its uppermost position in the direction opposite to the direction of the arrow 450, under the bias of the spring 412*d*. With reference to FIG. 20, the sliding actuating plate 422 moves in the direction of arrow 432 under the bias of the spring 434 in response to the return movement of said "play" key 34, and the projection 462 on said sliding actuating plate 422 moves in the direction of arrow 432 away from the arm 568 of the second clutch actuating device 560** as indicated in FIG. 40.

This allows said device 560 to rotate counter-clockwise about the shaft 564 under the bias of the spring 572 so that the actuating edge 566 of said device 560 pushes the lug 552 of the second clutch device 546 causing said device 546 to rotate clockwise about the shaft 548. One of the claws 254 of the claw plate 256 continuously rotating with the pinion 258, pushes against the lug 550 of said second clutch device 546 so as to rotate the mutilated gear 280 slightly in the direction of arrow 348. Accordingly, said gear 280 is brought into meshing engagement with the pinion 258 and is rotated from its second stop position to its first stop position in the direction of arrow 348.

Referring to FIG. 37, the driving element 300 moves in the direction opposite to the direction of the arrow 324 when the roller 320 is driven by the cam disc 292. Said cam disc is secured to said mutilated gear 280 and drives said roller 320 as said mutilated gear 280 rotates in the direction of the arrow 348.

The lug 332 on said driving element 300 is latched by the stepped portion 334, located on the first arm 336 of the locking device 338, after said driving element 300 has been positioned as shown in FIG. 7.

Upon the movement of said driving element 300 in the direction opposite to the direction of the arrow 324, the lug 374 pushes against and causes the extending portion 376 of the lever 116 to pivot clockwise about the shaft 114 to the position of said lever 116, shown by the broken lines in FIG. 5. Then, the lever 100 pivots counter-clockwise about the shaft 94 and the pinch roller 104 moves away from the capstan 56. Bent tab 522 also moves out of slot 524 in the second control lever 506.

Simultaneously, with the above movement of said driving element 300, the pin 380, thereon drives and pivots the arm 382 of the first lever 188 counter-clockwise about the shaft 154. Accordingly, the idler wheel 200 moves out of contact with the driving pulley 48 and the lower take-up reel roller 148, causing the rotating power for the upper take-up reel roller 146 to be intermitted.

At the same time, the projection 392 on said driving element 300 moves away from the cushion plate 394 on the third arm 226 of the brake lever 214, so that said brake lever 214 pivots clockwise about the shaft 212 under the bias of the spring 220. Thus, the brake pad 218 on the first arm 216 of said brake lever 214 is pressed against the annular surface of the supply reel roller 124 so as to brake said roller 124. Moreover, since the cushion plate 397, which is secured to the bent member 396 of the driving element 300, moves away from the bent portion 398 of the third arm 238 of the brake lever 232, said lever 232 pivots counter-clockwise about the shaft 230 under the bias of the spring 240. The brake pad 234 secured to the first arm 236 of said lever 232 is pressed against the annular surface of the upper take-up reel roller 146 so as to brake said roller 146.

The instant that the pinch roller 104 begins to move away from the capstan 56 is coincident with the time when the idle wheel 200 begins to move away from the driving pulley 48 and the lower take-up reel roller 148 and also, with the time when the brake pads 218 and 234 begin to press against the supply reel roller 124 and the upper take-up reel roller 146, respectively. Accordingly, the tape 22 stops its movement when the pinch roller 104 moves out of contact with the capstan 56.

The lever 468 and the lever 476 are restored to their original positions, as shown in FIG. 21, by the action of the spring 484 in response to the upward, resetting movement of the "play" key 34 is shown by the position of the projection 440*d*. The movement of the arm 480 of the lever 476 in the direction opposite to the direction of the arrow 780 (FIG. 7) causes the second control lever 506 to pivot counter-clockwise about the shaft 508 until it reaches its original position, as shown in FIG. 7, and restores the third control lever 514 to the position shown in FIG. 7.

Referring now to FIG. 18, the operator can remove his finger, at any time, from the depressed "stop" key 30. After the depressing force has been removed, the action of spring 412*b* causes said "stop" key to return, in the direction of arrow 450, to its original position.

Various means will be described in detail for the condition when the tape recorder of the present invention is changed from a "stop" condition to a "fast-forward" condition.

Referring to FIG. 18, when the operator depresses the "fast-forward" key 32, the slide plate 402*c*, is latched by the sliding latch plate 420 in a way similar to that previously described for the depression of the "play" key 34. As shown in FIG. 41, the projection 440*c* on said plate 402*c* pushes the bent portion 474 of the lever 468 so as to pivot said lever 468, in a clockwise direction about the shaft 464, through a greater angle than that when said "play" key 34 is depressed.

Accordingly, the bent portion 474 of the lever 468 pushes against the arm 478 of the third lever 476 and causes it to rotate counter-clockwise about the shaft 482. The arm 480 of said lever 476 moves in the direction of arrow 780 away from the projection 518 of the second control lever 506 (FIG. 7). Thus the motion of the third control lever 514 under the bias of the spring 516 is transmitted to said lever 506 causing it to pivot clockwise about the shaft 508 so that the stepped portion 521 of said lever 506 is positioned facing the bent tab 522 on the first arm 96 of the lever 100. At the same time, because the third control lever 514 pivots counter-clockwise about the shaft 94 through a greater angle than in the case when the "play" key 34 is depressed, the bent tab 562 on said lever 514 moves away from the projection 528 on the lever 188 and is not able to engage with said projection 528.

Referring now to FIG. 11, the projection 530 on the third control lever 514 moves to the position 530*b*, shown by the broken lines, and pushes against the tab 388 on the member 160 so as to rotate said member 160 clockwise about the shaft 154 to the position shown by the broken lines. Consequently, the hook 390 on said member 160 moves to the position in which the hook 390 is engageable with the lug 374 of the driving element 300.

With reference to FIG. 20, the sliding actuating plate 422 moves in the direction opposite to the direction of the arrow 432 and the sliding latch plate 420 moves in the direction of the arrow 432. Said motion is reciprocating in connection with the depressing movement of the "fast-forward" key 32 in a fashion similar to that which was described above for the depression of the "play" key 34. As shown in FIG. 38, the actuating edge 576 of the first clutch actuating device 574 actuates the first clutch device 532, positioned on the gear 280, at its first stop position so as to bring said gear 280 into a meshing engagement with the pinion 258. Then, the gear 280 rotates in the direction of arrow 348 from its first stop position to its second stop position. Said motion causes the driving element 300 to instantaneously move in the direction of arrow 324. Then, the lever 100 has a tendency to pivot clockwise about the shaft 94 under the bias of the spring 110, but the rotation of said lever 100 is interrupted by the bent tab 522 on the first arm 96, thereof, which is caught by the stepped portion 521 on the second control lever 506. Consequently, the pinch roller 104 is not pressed against the capstan 56.

As the driving element 300 moves in the direction of arrow 324 (FIG. 11), the lug 374 thereof is caught on the hook 390 of the member 160 so as to drive said member 160 in the same direction. Accordingly, the upper step 531 of the cam portion 158 of the member 160 pushes the subsidiary plate 180 upwards and lifts the first lever 188 against the action of the spring 196 (FIGS. 10 and 12). The idler wheel 200 occupies the position corresponding to the height of the stepped section 210 of the driving pulley 48 and the upper take-up reel roller 146 the position as shown by the broken line in FIG. 9.

At the same time, said first lever 188 pivots clockwise about the shaft 154 under the bias of the spring 208 in accordance with the movement of the pin 380 located on the driving element 300, in the direction of arrow 324 (FIG. 7). Also, the idler wheel 200 is brought into driving engagement between the stepped section 210 of the driving pulley 48 and the upper take-up reel roller 146 so that the rotational power of the motor 44 is transmitted directly to the upper take-up reel roller 146. In advance of the operation described above, the brake pads 218 and 234 are completely separated from the annular surfaces of the reel rollers 124 and 146 as described above in connection with the depression of the "play" key 34. Thus, the tape 22 is forwarded from the supply reel 12 (FIG. 1) and is rapidly wound on the take-up reel 14.

Next, the operation of various means will be described for the situation when the operator depresses the "stop" key 30 while the tape recorder is operating in the "fast-forward" condition. When the operator depress the "stop" key 30 (FIG. 18), the "fast-forward" key 32 is returned to its raised position. Thus, the sliding actuating plate 422 returns to its original position under the bias of the spring 434, and the actuating edge 566 of the second clutch actuating device 560 moves the second clutch device 546 positioned on the gear 280, from its second stop position, as shown in FIG. 40, so as to bring said gear 280 into a meshing engagement with the pinion 258. The gear 280 rotates from its second stop position to its first stop position in the direction of arrow 348. This rotation of said gear 280 drives the driving element 300 in the direction opposite to the direction of the arrow 324 in FIG. 7, and the pin 380 located thereon, pushes the arm 382 of the first lever 188 so as to pivot said lever 188 counter-clockwise about the shaft 154. Consequently, the idler wheel 200 is moved out of contact with the driving pulley 48 and the upper take-up reel roller 146. At the same time, the member 160 moves in the direction of arrows 172 (FIG. 11) under the bias of the spring 170 in accordance with the movement of the lug 374 located on the driving element 300, in a direction opposite to the direction of the arrow 324. The movement of the cam portion 158 of said member 160 causes the first lever 188 to be depressed under the action of the spring 196, as shown in FIG. 12. The idler wheel 200 descends to the position shown in FIG. 8*b*.

The hook 390 of the member 160 is disengaged from the lug 374 of the driving element 300, because said lug 374 continues to move after said member 160 has stopped its movement and the left end of the slot 162 of said member 160 is pressed against the shaft 154. The projection 530 on the third control level 514 returns to its original position, shown by the solid line in FIG. 11, in response to the upward, returning movement of the "fast-forward" key 32. Accordingly, said member 160 is pivoted counterclockwise about the shaft 154 to the position shown by the solid line of the spring 170.

At the same time, as the driving element 300 moves in the direction opposite to the direction of the arrow 324, the brake pads 218 and 324 are pressed against the annular surface of the reel rollers 124 and 146 so as to brake said rollers 124 and 146 as also described above. Thus, the tape is stopped without becoming slack.

The following description will explain the means for switching from "stop" to "rewind." Referring to FIG. 18, when the "rewind" key 28 is depressed, the slide plate **402*a* of said key 28 is latched by the sliding latch plate 420 in a way similar to that when the "play" key 34 is depressed. Simultaneously, the arm 470 of the lever 466 is driven by the projection 440*a* on the slide plate 402*a* so that said lever 466 pivots counter-clockwise about the shaft 464 to the position indicated by the broken lines of FIG. 21. Since the arm 472 of said lever 466 moves away from one end 500 of the first control lever 490, the first control lever 490 rotates clockwise about the shaft 492 under the bias of the spring 494 so as to move the stepped portion 502 of said lever 490 to the position indicated by the broken lines in FIG. 22. The lug 504 on the second arm 134 of the lever 126 thus does not engage with said stepped portion 502**.

On the other hand, the first clutch actuating device 574 actuates the first clutch device 532 to engage the gear 280 and the pinion 258, similar to the engagement obtained when the tape recorder is changed from "stop" to "play," in connection with the depression of the "rewind" key 28, as shown in FIG. 38. The driving element 300 instantly moves in the direction of the arrow 324 in association with the rotation of the gear 280 from its first stop position to its second stop position, as shown in FIG. 7. The lever 100 starts to pivot clockwise about the shaft 94 under the bias of the spring 110 as mentioned above; however, the bent tab 522 on the first arm 96 is retained by the stepped portion 520 on the second control lever 506 thus preventing the lever 100 from pivoting. As a result, the pinch roller 104 is not pushed against the capstan 56.

The movement of the driving element 300 in the direction of the arrow 324 drives the brake levers 214 and 232 so as to separate the brake pads 218 and 234 from the annular surface of the supply reel roller 124 and the upper take-up reel roller 146 and to free said rollers 124 and 146. In accordance with the movement of the lug 378 of the driving element 300 in the direction of the arrow 324, as shown in FIG. 42, the lever 126 pivots clockwise a sufficient amount about the shaft 66 under the bias of the spring 140 because the lug 504 of the second arm 134 is not blocked by the stepped portion 502 of the first control lever 490. The endless belt 130 wound around the pulley 128, mounted on said lever 126, is pushed into contact with the stepped section 142 of the driving pulley 48 (FIG. 8*b*). The rotational power of the motor 44 is transmitted through said endless belt 130 to the supply reel roller 124 so as to cause said roller 124 to rotate clockwise. The tape 22 of FIG. 1 is unwound from the take-up reel 14 and is wound back upon the supply reel 12.

The following description will explain the operation of the various means when the "stop" key 30 is depressed while the tape recorder is operating in the "rewind" condition.

Referring to FIG. 18, the depression of the "stop" key 30 causes the depressed "rewind" key 28 to return to its original position. The sliding actuating plate 422 of FIG. 20 returns, in the direction of the arrow 432, under the bias of the spring 434 in such a way that the second clutch actuating device 560 actuates the second clutch device 546 so as to achieve an engagement between said gear 280 and the pinion 258, as shown in FIG. 40. The gear 280 rotates in the direction of the arrow 348 from its second stop position to its first stop position. The rotation of said gear 280 drives the driving element 300 in the direction opposite to the direction of arrow 324, as shown in FIG. 7. In accordance with the movement of the driving element 300, the lug 378 pushes against and causes the first arm 132 of the lever 126 to pivot counter-clockwise about the shaft 66 so as to separate the endless belt 130 from the driving pulley 48 and to interrupt the transmission of the rotational power to the supply reel roller 124.

With the movement of the driving element 300 in a direction opposite to the direction of the arrow 324, the brake pads 218 and 234 are pushed against the periphery of the upper take-up reel roller 146 and brake said rollers so as to stop the tape without causing slack in the tape.

The tape recorder, according to the present invention, contains a feature which allows the various keys to achieve various operations, other than those described above. Some typical examples will be explained below.

When the operator depresses the "play" key 34 (FIG. 18) while the tape recorder is in the "fast-forward" condition, the sliding latch plate 420 moves initially in the direction of the arrow 432 and subsequently in the direction opposite to the direction of said arrow 432 so as to return the "fast-forward" key 32 to its raised position, as shown in FIG. 36, and by the raised position of the projection **440*c* to latch the "play" key 34 in the depressed position. The lever 468 and the lever 476 start to pivot from the position shown in FIG. 41 to the position shown in FIG. 36 under the bias of the spring 484. The second control lever 506 is not able to pivot counter-clockwise about the shaft 508 due to the frictional force between the stepped portion 521 of the second control lever 506 and the bent tab 522 of the first arm 96 of the lever 100 which is retained by said lever 506. As a result, the lever 468 and the lever 476** remain in the position shown in FIG. 41.

On the other hand, the sliding actuating plate 422 stops at a position displaced in a direction opposite to the direction of the arrow 432 because the "fast-forward" key 32 is in its normal raised position and the "play" key 34 is depressed. When the machine is operating in a "fast-forward" condition, the clutch means occupies the position shown in FIG. 39 and the mutilated gear 280 stops at its second stop position. The depression of the "play" key 34 causes the sliding latch plate 420 to move forward and then backward so that the projection, 454 on said plate 420 tentatively pushes the arm 592 of the trigger lever 584 in the direction of the arrow 432. Therefore, the lug 578 on the first clutch actuating device 574 is unlatched from the stepped portion 590 of the trigger lever 584, as shown in FIG. 43, so that the first clutch actuating device 574 rotates counter-clockwise about the shaft 564 under the bias of the spring 588. This rotation causes the actuating edge 576 of said device 574 to push the lug 552 of the second clutch device 546 so that said device 546 rotates clockwise about the shaft 548. During said rotation, one of the claws 254 of the claw plate 256 pushes against the lug 550 of said second clutch device 546 and achieves a meshing engagement between the gear 280 and the pinion 258.

The gear 280 rotates in the direction of the arrow 348 from its second stop position to its first stop position, as shown in FIG. 38. The first clutch actuating device 574, positioned to rotate counter-clockwise, causes the actuating edge 538 of the first clutch actuating device 574 to push against the lug 538 of the first clutch device 532, which rotates with the gear 280. The first clutch device 532 rotates clockwise about the shaft 534 and during said rotation the lug 536 is kicked by one of the claws 254 of the rotating claw plate 256 so as to achieve a meshing engagement between the pinion 258 and the gear 280. Consequently, the gear 280 continues rotating from its first stop position to its second stop position in the direction of the arrow 348 and finally stops at the second stop position, as shown in FIG. 39. Before coming to rest, the gear 280 rotates one turn. During said rotation of the gear 280 from its first stop position, shown in FIG. 38, to its second stop position (FIG. 39), the first clutch actuating device 574 is rotated clockwise by the reset pin 626 so that the lug 578 of said device 574 is latched by the stepped portion 590 of the trigger lever 584. The one rotation of the gear 280 makes the driving element 300 (FIG. 7) move with a reciprocating movement.

During the rotation of the gear 280 from its second stop position to its first stop position, the driving element 300 moves in the direction opposite to the direction of the arrow 324 so that the tape recorder is switched to the "stop" state as described above. Since the lever 100 is driven so as to pivot counter-clockwise about the shaft 94, the second control lever 506 can move counter-clockwise about the shaft 508 due to the release of the engagement between the bent tab 522 of the first arm 96 and the stepped portion 521 of the second control lever 506. Consequently, the lever 468 and the lever 476 pivot under the bias of the spring 484 from the position shown in FIG. 41 to the position shown in FIG. 36. At the same time, the arm 480 of the lever 476 pushes the projection 518 of the second control lever 506 so as to pivot said lever 506 counter-clockwise about the shaft 508 and thus cause the cut-out portion 524 to be positioned facing the bent tab 522 of the first arm 96 of said lever 100.

During the pivotal motion of the second control lever 506, the third control lever 514 pivots clockwise about the shaft 94. The projection 530 on the third control lever 514 (FIG. 11) moves to a position 530*a* from the position 530*b* as shown by the broken lines. When the driving element 300 moves as far as possible in the direction opposite to the direction of the arrow 324, the lug 374 of said element 300 is disengaged from the hook 390 of the member 160 so that said member 160 rotates counter-clockwise about the shaft 154 and moves to the position indicated by the solid line.

During the rotation of the gear 280 from its first stop position to its second stop position, the driving element 300 moves in the direction of the arrow 324, shown in FIG. 37. Consequently, the pinch roller 104 is pushed against the capstan 56 and the idler wheel 200 is inserted between the stepped section 76 of the driving pulley 48 (FIG. 9) and the lower take-up reel roller 148 (FIG. 9). At the same time the brake pads 218 and 234 are moved out of contact with the periphery of the supply reel roller 124 and the upper take-up reel roller 146 and the tape recorder is finally positioned in the "play" position.

The tape 22, which is being quickly wound around the take-up reel 14 of FIG. 1, is temporarily stopped by the depression of the "play" key 34. Subsequently, the tape recorder is automatically changed to the "play" condition so as to wind the tape on the take-up reel 14 at a predetermined speed. Therefore, the tape-recorder, according to the present invention, removes the disadvantage inherent in conventional tape recorders which require that the selection means manually pass through the "stop" position when changing from "fast-forward" to "play."

The tape recorder, according to the present invention, can be changed directly from "fast-forward" to "rewind," from "play" to "fast-forward," from "play" to "rewind," from "rewind" to "fast-forward" and from "rewind" to "play" in a manner similar to that described above for changing from "fast-forward" to "play." In association with the single rotation of the gear 280, the tape recorder can be changed from its initial state through "stop," which is automatically realized, to a desired state in such a way that the control means, for controlling the tape moving means, the reel roller rotating means and the brake means, which are driven by driving means, is changed to a position corresponding to the position of the push button key of the selection means subsequently depressed.

A change to "record" can be accomplished, by depressing the "play" key 34 and the "record" key 36 at the same time, in a way similar to that when only the "play" key 34 is depressed. This causes the amplifier 764 to be switched from a reproducing condition to a recording condition by the depression of the "record" key 36. A detailed description of this operation will be omitted in order to avoid a long description which will add nothing to this disclosure.

The tape recorder, according to the present invention, is designed so as not to damage any of the parts when the operator erroneously depresses two or more keys at the same time. This will be illustrated below with respect to the "rewind" key 28, the "fast-forward" key 32 and the "play" key 34.

Referring to FIG. 41, when the "fast-forward" key 32 and the "play" key 34 are erroneously depressed at the same time, the projection 440*d* of the slide plate 402*d* corresponding to the "play" key 34 moves down to a position 440*d'* indicated by the broken lines. The bent portion 474 of the lever 468 does not contact said projection with 440*d'* position because the projection 440*c* of the slide plate 402*c* of the "fast-forward" key 32 pushes against said bent portion 474 so that said lever 468 pivots through an angle greater than the angle through which it would pivot if it were contacted by projection 440*d*. Therefore, the tape-recorder is changed to a "fast-forward" state in a manner similar to when only the "fast-forward" key 32 is depressed.

When the "rewind" key 28 and the "play" key 34 (FIG. 21) are erroneously depressed at the same time, the lever 466 is pushed by the projection 440*a* of the slide plate 402*a* so as to rotate counter-clockwise about the shaft 464 and the bent portion 474 of the lever 468 is pushed by the slide plate 440*d* so that the lever 476 pivots counter-clockwise about the shaft 482. Referring to FIG. 7, the first control lever 490 starts to pivot clockwise about the shaft 492 under the bias of the spring 494 and the second control lever 506 starts to pivot clockwise about the shaft 508 due to the force of the spring 516, transmitted through the third control lever 514. When the "rewind" key 28 is depressed before the "play" key 34, the first control lever 490 pivots clockwise through a predetermined angle because the first control lever 490 pivots sooner than the second control lever 506. The second control lever 506, however, is prevented from pivoting clockwise because an edge 786 of a sickle shaped arm 784 is retained by the tab 496 of the first control lever 490 which extends upward through an opening 788 of the main chassis 40. Therefore, the tape recorder according to the present invention, would be changed to the "rewind" position.

On the other hand, when the "play" key 34 is depressed in advance of the "rewind" key 28, the second control lever 506 pivots clockwise through a predetermined angle because the second control lever 506 pivots sooner than the first control lever 490. The first control lever 490, however, is prevented from pivoting clockwise because the tab 496 thereof is retained by the sickle shaped arm 784 of the second control lever 506. Therefore, the tape recorder, according to the present invention, would be changed to the "play" position in a way similar to that described above.

When the "rewind" key 28 and the "play" key 34 are depressed at exactly the same time, the tab 496 on the first control lever 490 and the edge 786 of the sickle shaped arm 784 of the second control lever 506 collide with each other and both are prevented from pivoting in the clockwise direction. In such a case the mutilated gear 280 rotates from its first stop position to its second stop position in such a way as to instantly move the driving element 300 in the direction of the arrow 324 and to separate the lug 378 of said element 300 from the first arm 132 of the lever 126. In such a case, said lever 126 is prevented from pivoting counter-clockwise about the shaft 66 so that the lug 504 of said lever 126 is restrained by the stepped portion 502 of the first control lever 490. Therefore, the motor 44 will not supply rotational power to the supply reel roller 124. In association with the movement of said driving element 300 in the direction of the arrow 324, the pin 380, secured to the upper portion of the driving element 300, moves away from the arm 382 of the first lever 188, whereas the projection 528 on said lever 188 is restrained by the bent tab 526 on the third control lever 514 so as to prevent said lever 188 from pivoting clockwise about the shaft 154. Therefore, none of the rotational power from the motor 44 is supplied to the upper take-up reel roller 146. Likewise, in accordance with the movement of the driving element 300 in the direction of the arrow 324, the lever 100 starts to pivot clockwise about the shaft 94, whereas the bent tab 522 on said lever 100 is restrained by the stepped portion 520 of the second control lever 506 so as to prevent said lever 100 from pivoting clockwise. As a result, the pinch roller 104 is not pushed against the capstan 56. In this condition, the tape remains stopped regardless of the movement of the driving element 300 in the direction of the arrow 324. This will appear strange to the operator, that the tape does not move even when the selection means is depressed so as to make the tape recorder operable. This situation occurs due to the erroneous operation of the selection means. Correction involves depressing the "stop" key 30 so as to bring the tape recorder to a stop condition and then depressing the desired push button key.

A similar result will be obtained in the case where the "rewind" key 28 and the "fast-forward" key 32 are depressed at the same time or where the "rewind" key 28, "fast-forward" key 32 and the "play" key 34 are depressed at the same time. The tape recorder assumes the operating state corresponding to that of the first key which is depressed or, when two or three keys are depressed at exactly the same time, a condition to stop the movement of the tape.

It will be obvious from the above description that the tape is never subjected to any undersirabe extensional forces even when, for example, the "rewind" key 28 and the "fast-forward" key 32 are depressed at the exact same time.

The following description will explain the operation of the various means when an operator brings the tape recorder into the "instant stop" condition from a "play," "record," "fast-forward" or "rewind" condition by the remote control switch.

The clutch means is positioned as shown in FIG. 39 and the mutilated gear 280 stops at its second stop position when the tape recorder is positioned in a "play," "record," "fast-forward" or "rewind" condition. The depression of the push button switch 774 (FIG. 34) causes the solenoid 606 to be energized, as shown in FIG. 33, resulting in the plunger 610 being pulled into said solenoid, as shown in FIG. 44. The third clutch actuating device 604 rotates counter-clockwise about the shaft 504 and the lug 618 on said device 604 pushes the second clutch actuating device 560 along the slot 562 to the position indicated in FIG. 44. The actuating edge 566 of said device 560 pushes against the lug 552 of the second clutch device 546 and causes said device 546 to rotate clockwise about the shaft 548. One of the claws 254 of the claw plate 256, rotating in the direction of the arrow 278, pushes against the lug 550 of said second clutch device 546 so as to cause a meshing engagement between the gear 280 and the pinion 258. The gear 280 rotates in the direction of the arrow 348 from its second stop position to its first stop position. The rotation of the gear 280 causes the driving element 300 to move in the direction opposite to the direction of the arrow 324 (FIG. 7) so that the tape recorder is positioned in a "stop" condition in order to stop the movement of the tape 22. However, this condition, in which the keys 28, 34, 34 or 36 are depressed, differs from the "stop" condition which was described above and it is called "instant stop." When the operator removes his finger from the push button switch 774, the solenoid 606 is cut off and the third clutch actuating device 604 rotates clockwise about the shaft 564 under the bias of the spring 572 in order to return to the position shown in FIG. 38. Therefore, the first clutch actuating device 574 rotates counter-clockwise about the shaft 564 under the bias of the spring 588 to actuate the first clutch device 532 and to cause the gear 280 and the pinion 258 to meshingly engage. The gear 280 rotates from its first stop position to its second stop position in the direction of the arrow 348 and then the driving means operates in accordance with the keys which are depressed so that the tape recorder returns to the "play," "record," "fast-forward" or "rewind" condition.

The above description has been given for the case when the operator produces the "instant stop" condition by means of the remote control means, consisting of turning the push button switch 774 on or off. Said "instant stop" condition can be achieved by turning the knob 38 of FIG. 1 directly so as to manually operate the third clutch actuating device 604, as shown in FIG. 44, in a way which is similar to that when the remote control switch is used.

The following description will explain the operation of the various means for the condition when the tape recorder is switched to a "stop" condition because the tape is accidentally cut or wound completely around the reel 12 or 14 while the tape recorder is in a "play," "record," "fast-forward" or rewind condition.

When the tape recorder is in its operating condition, the clutch means is positioned as shown in FIG. 39 and the mutilated gear 280 is stopped at its second stop position. The absence of the tape 22 at the tape guiding path 27 (FIG. 1) causes the detecting rod 628 to move in the direction of the arrow 676 allowing the lever 638 to pivot clockwise about the shaft 640. The micro-switch 634, in FIG. 26, is closed so as to energize the solenoid 606 and to depress the plunger 610, as shown in FIG. 44. The third clutch actuating device 604 rotates counter-clockwise about the shaft 564 so as to achieve a meshing engagement between the gear 280 and the pinion 258. Said gear 280 rotates in the direction of the arrow 348 from its second stop position to its first stop position. Said rotation of said gear 280 causes the driving means to be positioned in the "stop" condition. The rotation of the lever 638 to the position shown by the broken lines of FIG. 39 causes the third arm 620 of the third clutch actuating device 604 to move away from the cam portion 672 of the rocker arm 664 of FIG. 39 so that said rocker arm 664 is positioned horizontally when said third clutch actuating device 604 rotates counter-clockwise.

When the gear 280 rotates to the vicinity of its first stop position, one end of said rocker arm 664 is pushed by the pin 674, secured to the lower face of said gear 280, so that the lever 662 pivots counter-clockwise about the shaft 508, as shown in FIG. 30. In association with the rotation of the lever 662, the lever 692 is pivoted by the connecting rod 684 counter-clockwise about the shaft 600 to the position shown in FIG. 30. The counter-clockwise rotation of the lever 692 causes the pin 736 positioned thereon, to move to the left side of the shaft 722 so that the switch lever 730 is provided with the power to pivot clockwise under the action of the spring 740. Therefore, the switch lever 730 pivots slowly in a clockwise direction about the shaft 772 and against the viscosity resistance of the damping device 714. During this rotation, the lug 746 of said lever 730 drives the idler-off lever 752 so as to cause it to pivot counter-clockwise about the shaft 114. This rotation causes the lever 68 to pivot clockwise about the shaft 66 due to the force exerted by the rod 758 as shown in FIG. 32 so as to slowly separate the first idler wheel 64 from both the driving pulley 48 and the flywheel 54. When the first idler wheel 64 is disengaged from the driving pulley 48 and the flywheel 54, the motor 44 does not supply rotational power to the flywheel 54 and thus not to the mutilated gear 280. Since the switch lever 730 pivots slowly due to the viscosity resistance, said gear 280 rotates to its first stop position before the rotational power is interrupted. Therefore, the gear 280 will not stop rotating while meshingly engaged with the pinion 258.

At the final stage of the rotation of said switch lever 730, the first arm 734 thereof turns the push button 742 of the micro-switch 744 off, thus cutting off electric power to the motor 44, the recording and reproducing amplifier 764 of the transformer 768, as shown in FIG. 33. When the solenoid 606 is not provided with electric power, the plunger 610 rises causing the third clutch actuating device 604 to rotate clockwise under the bias of the spring 672 and to return to the position shown in FIG. 24. As explained with respect to the change from the "instant stop" to an operating condition, the first clutch actuating device 544 starts to rotate counter-clockwise about the shaft 564. Prior to said rotation, the connecting rod 684 moves in the direction of the arrow 432 so that the lug 698 thereon pushes the projection 456 of the sliding latch plate 420 in order to move said plate 420 in the direction of the arrow 432. Therefore, any of the keys of the push button device 400 which are depressed, return to their raised position. In addition, the sliding actuating plate 422 is also moved in the direction of the arrow 432 under the bias of the spring 434 so that the projection 462 on said plate 422 pushes against and causes the lever 596 of FIG. 24 to pivot counter-clockwise about the shaft 594. Therefore, the projection 603 on said lever 596 restrains the lug 578 on the first clutch actuating device 574 and prevents said device 574 from rotating counter-clockwise.

In such a way the tape recorder, according to the present invention, is changed automatically to the "stop" condition and electric power for the motor and the recording and reproducing amplifier is cut off when the tape is not present in the tape guiding path 27. In addition, the knob 20, and keys 28, 32, 34 and 36 return to their original positions.

The case can occur where the lever 692 is not free to pivot counter-clockwise because the operator erroneously operates the tape recorder in that he attempts to pivot said knob 20 clockwise during the operation of the above automatic stop. In this situation, the pin 674 on the gear 280 pushes against the rocker arm 664 and pivots the lever 662 counter-clockwise so that the shaft 686, secured to one end of the lever 662, moves along the slot 682 of the connecting rod 684 to extend the spring 684. In such a way, the parts of the apparatus are protected from undesirable forces.

The greatest feature of the tape recorder according to the present invention is that the force necessary for depressing the keys of the push button device 400 is greatly reduced. According to the present invention, the required force is about 0.6 lb. This force is small enough that it can easily be achieved by a child. The reason that only a reduced force is required is that the control means and the clutch means are designed to be operable under a force which is only enough to give the corresponding displacement when the operator pushes the "play" key 34, the "fast-forward" key 32 or the "rewinding" key 28. The force of the spring in said control means and said clutch means can be kept low enough to just overcome the force necessary for displacing said control means and said clutch means.

The force for depressing the "stop" key 30 need only be enough to move the sliding latch plate 420 and to return the other keys to the raised positions. An operator is required to impart only a small force to overcome the sum of the frictional force between one of said other keys and the sliding latch plate 420 and the force of the spring which is connected to said sliding latch plate 420.

Another feature of the present invention is that a tape recorder is provided which can be used in the vertical position as shown in FIG. 1. This is possible because the push button device requires only a small force to operate. There is no fear that the depression of the keys will cause the vertical type tape recorder to move along a supporting surface, such as a table, or fall down. Such a tape recorder can be conveniently installed in a book shelf.

A further feature of the present invention is that it provides a tape recorder which is designed so as not to impart undesirbale forces to the clutch devices 532 and 546 and the claws 254 of the claw plate 256 (FIG. 13). The roller 344 of said gear 280 is pushed against the lip 340 of the second arm 342 of the locking device 338 after one of the claws 214 pushes the lug 536 of the first clutch device 532 so as to completely accomplish the meshing engagement between the pinion 258 and the mutilated gear 280. Practically no force is required for rotating the gear 280 until the pinion 258 of the first clutch device 532 meshes with one of the claws 254. There exists a suitable gap between the driven roller 320 of the driving element 300 and the cam disc 292 when the gear 280 is positioned at its second stop position. Therefore, it is necessary to impart sufficient force to said gear 280 to rotate it through a suitable angle in the direction of the arrow 348 from its second stop position, thus causing said roller 320 to come into contact with the periphery of the cam disc 292. There is practically no need to impart a rotational force to gear 280 during the time period from the time when one of the claws 254 pushes against the lug 550 of the second clutch device 546 (FIG. 40) to the time when the pinion 258 starts to make the meshing engagement with the gear 280. The tape recorder, according to the present invention, is thus constructed such that the wear of the claws 254 and the lugs 536 and 550 of the claw devices 532 and 546 will not effect the meshing engagement between the pinion 258 and the mutilated gear 280.

A further feature of the present invention is that the tape recorder is capable of shortening the time period necessary for obtaining a predetermined tape speed when the machine is changed from the "stop" to the "play" condition. Referring to FIG. 13, the mutilated sections are so arranged that the angle of rotation from the first stop position of the mutilated gear 280 to the second stop position is less than that from the second stop position to the first stop position. As said mutilated gear 280 rotates from its first stop position (FIG. 7) it instantly moves the driving element 300 in the direction of the arrow 324 to the position of FIG. 37. Thus, as soon as the tape 22 starts to move in the direction of the arrow 782, by means of the capstan 56 and the pinch roller 104, the second mutilated section 290 of the gear 280 is brought into a position facing the pinion 258 so as to stop the rotation of said gear 280. There is no fear that the torque necessary to rotate said gear 280 will result in a retardation in the rotation of the capstan 56 due to a prolongation of the meshing engagement between said gear 280 and the pinion 258 regardless of the movement of the tape 22. This results in the reduction of the time period necessary for obtaining the predetermined speed of the tape which is initially moved by the capstan 56 and the pinch roller 104.

On the other hand, said gear 280 is required to rotate through a larger angle when the tape recorder is changed to the "stop" condition. The reduction of the rotation speed of the capstan 56 due to the torque required to rotate the gear 280 produces practically no undesirable effects on the operation of the tape recorder during the movement of the pinch roller 104 which is spaced a predetermined distance from the capstan 56, because the tape stops moving as soon as the pinion roller 104 is separated from the capstan 56.

What is claimed is:

1. In a tape recorder, the combination comprising:
a motor;
tape moving means for moving a tape at a tape playing speed;
a supply reel roller and a take-up reel roller;
reel roller rotating means including
means to rotate the take-up reel roller at a fast rate for fast-forward drive of the tape and at the tape playing speed, and
means to rotate the supply reel roller for rewind drive of the tape;
brake means for braking said take-up reel roller and said supply reel roller;
driving means coupled to said motor and to said tape moving means, said reel roller rotating means and said brake means whereby, by the force of the motor, to selectively couple said tape moving means and said reel roller rotating means to said motor and to operate said brake means;
selection means including
choosing means to select from among the condition of "play," "record," "fast-forward," "rewind" and "stop," and
a control means which is responsive to said choosing means for controlling the operation of said tape moving means and said reel roller rotating means in response to said driving means; and
clutch means in said driving means and actuated by said selection means to intermit the driving power between said driving means and said motor.

2. A tape recorder as claimed in claim 1, wherein said driving means includes a reciprocally movable driving element coupled to said tape moving means, said reel roller rotating means and said brake means for selectively operating said means, said means being operated to place the tape recorder in the "play," "record," "fast-forward" and/or "rewind" condition when the driving element is moved in one direction and in the "stop" condition when the driving element is moved in the opposite direction.

3. A tape recorder as claimed in claim 1, wherein said driving means includes:
a pinion coupled to said motor and continuously rotated by said motor;
a mutilated gear having a cam disc secured thereto and rotatable therewith, said gear being engaged by and intermittently rotated by said pinion; and
a driving element engaged by and moved by said cam disc and coupled to and selectively operating said tape moving means, said reel roller rotating means and said brake means.

4. A tape recorder as claimed in claim 3, wherein said pinion is provided with more than one claw intermittently engaging with said mutilated gear.

5. A tape recorder as claimed in claim 3, wherein said driving means further includes:
spring means coupled to said driving element, said driving element being driven by said cam disc in one direction and said spring means being loaded, a locking device engaging said driving element at the end of movement in said one direction, said driving element being instantaneously moved in the opposite direction by said spring means when said driving element is unlatched from said locking device by the rotation force of said mutilated gear.

6. A tape recorder as claimed in claim 1, wherein said selection means includes:
a push button device having a "play" key, a "fast-forward" key, a "rewind" key and a "stop" key, and
a control means which is responsive to one of said keys and which engages between said driving means and said tape moving means, and between said driving means and said reel roller rotating means for selecting the motion thereof.

7. In a tape recorder, the combinations comprising:
a motor;
tape moving means for moving a tape at a tape playing speed;
a supply reel roller and a take-up reel roller;
reel roller rotating means including
means to rotate the take-up reel roller at a fast rate for fast-forward drive of the tape and at the tape playing speed, and
means to rotate a supply reel roller for rewind drive of the tape;
brake means for braking said take-up reel roller and said supply reel roller;
driving means including
a pinion coupled to the motor and continuously rotated by the motor,
a mutilated gear provided with two mutilated sections and engaged by and intermittently rotated by said pinion between a first and a second stop position, and
a driving element coupled to said tape moving means, said reel roller rotating means and said brake means whereby, by the rotation force of said mutilated gear, to selectively couple said tape moving means and said reel roller rotating means to said motor and to operate said brake means;
selection means including
a push button device having a "play" key, a "fast-forward" key, a "rewind" key and a "stop" key, and
a control means which is responsive to one of said keys and which engages between said driving element and said tape moving means, and between said driving element and said reel roller rotating means for selecting the motion thereof;
clutch means including
a first clutch device and a second clutch device mounted on said mutilated gear,
a first clutch actuating device engageable with said first and second clutch devices to actuate them,
a second clutch actuating device engageable with said second clutch device to actuate it, said clutch actuating devices being coupled to said push button devices for actuation thereby, and claw means secured to said pinion for engaging with said first and second clutch devices.

8. A tape recorder as claimed in claim 7, wherein said push button device includes:

a sliding latch plate for latching said "play" key, said "fast-forward" key and the "rewind" key when they are depressed, and responsive to depression of said "stop" key to release a latched key, and a sliding actuating plate responsive to said "play" key, said "fast-forward" key and said "rewind" key; and said clutch means includes a trigger lever engaging with said first clutch actuating device, said trigger lever being driven by said sliding latch plate for actuating said first clutch device, and said second clutch actuating device being engaged by and driven by said sliding actuating plate for actuating said second clutch device when said "stop" key is depressed to release a latched key.

9. A tape recorder as claimed in claim 8, wherein said first clutch actuating device has a member thereon engaged by said mutilated gear to reset said first clutch actuating device to said trigger lever by the rotation force of said mutilated gear while said gear is rotating from the first stop position to the second stop position thereof.

10. A tape recorder as claimed in claim 7, wherein said mutilated gear is provided with two toothless sections, one of which is provided on said gear at a position corresponding to the first stop position thereof and the other of which is provided on said gear at a position corresponding to the second stop position thereof, and further the angle through which said gear rotates from the first stop position to the second stop position is smaller than that from the second stop position to the first stop position.

11. In a tape recorder, the combination comprising:

a motor;

tape moving means for moving a tape at a tape playing speed;

a supply reel roller and a take-up reel roller;

reel roller rotating means including means to rotate the take-up reel roller at a fast rate for fast-forward drive of the tape and at the tape playing speed, and means to rotate the supply reel roller for rewind drive of the tape;

brake means for braking said take-up reel roller and said supply reel roller;

driving means coupled to said motor and to said tape moving means, said reel roller rotating means and said brake means, whereby, by the force of the motor, to selectively couple said tape moving means and said reel roller rotating means to said motor and to operate said brake means;

selection means including choosing means to select from among the conditions of "play," "record," "fast-forward," "rewind" and "stop," and a control means which is responsive to said choosing means and for controlling the operating of said tape moving means and said reel roller rotating means in response to said driving means;

clutch means in said driving means to intermit the driving power between said driving means and said motor;

clutch actuating devices coupled to said clutch means and actuated by said selection means; and clutch actuating means coupled to and actuated by said selection means for actuating said clutch means for moving said driving means to "instant stop" operation when said driving means are in "play," "record," "fast-forward" and/or "rewind" conditions.

12. A tape recorder as claimed in claim 11, wherein said clutch actuating means includes a third clutch actuating device coacting with said clutch means; and a solenoid having a manually actuated remote switch device and engaging with said third clutch actuating device.

13. In a tape recorder, the combination comprising:

a motor;

tape moving means for moving a tape at a tape playing speed;

a supply reel roller and a take-up reel roller;

reel roller rotating means including means to rotate the take-up reel roller at a fast rate for fast-forward drive of the tape and at the tape playing speed, and means to rotate the supply reel roller for rewind drive of the tape;

brake means for braking said take-up reel roller and said supply reel roller;

driving means coupled to said motor and to said tape moving means, said reel roller rotating means and said brake means, whereby, by the force of the motor, to selectively couple said tape moving means and said reel roller rotating means to said motor and to operate said brake means;

selection means including choosing means to select from among the conditions of "play," "record," "fast-forward," "rewind" and "stop," and a control means which is responsive to said choosing means for controlling the operation of said tape moving means and said reel roller rotating means in response to said driving means;

clutch means in said driving means to intermit the driving power between said driving means and said motor;

clutch actuating devices coupled to said clutch means and operated by said selection means;

clutch actuating means coupled to and actuated by said selection means for actuating said clutch means for moving said driving means to "instant stop" operation when said driving means is in the "play," "record," "fast-forward" and/or "rewind" conditions;

detecting means to detect the presence of the tape in a predetermined path; and automatic stop means including means responsive to said detecting means and coacting with said clutch actuating means to actuate said clutch means, and reset means coupled to said selection means to reset said selection means and to cut off the power supply to said motor.

14. A tape recorder as claimed in claim 13, wherein said clutch actuating means includes a third clutch actuating device coacting with said clutch means, and a solenoid having a manually actuated remote switch device and engaging with said third actuating device, said solenoid also being coupled to and responsive to said detecting means.

15. A tape recorder as claimed in claim 13, wherein said automatic stop means for cutting off the power supply to said motor includes a damping device.

References Cited

UNITED STATES PATENTS

| | | | |
|---|---|---|---|
| 3,137,454 | 6/1964 | Atsumi | 242—55.12 |
| 3,216,275 | 11/1965 | O'Connell | 74—483 |
| 3,286,943 | 11/1966 | Morimoto | 242—55.12 |

LEONARD D. CHRISTIAN, Primary Examiner

U.S. Cl. X.R.

74—483; 242—204; 274—11